United States Patent [19]
Lucey

[11] Patent Number: 5,180,757
[45] Date of Patent: * Jan. 19, 1993

[54] PHOTOPOLYMERIZABLE COMPOSITIONS USED IN ELECTRONICS

[76] Inventor: Michael Lucey, 11221 S. 51st St., Phoenix, Ariz. 85044

[*] Notice: The portion of the term of this patent subsequent to Jul. 28, 2009 has been disclaimed.

[21] Appl. No.: 701,664

[22] Filed: May 16, 1991

Related U.S. Application Data

[63] Continuation-in-part of Ser. No. 620,378, Nov. 29, 1990, Pat. No. 5,134,175, which is a continuation-in-part of Ser. No. 133,497, Dec. 16, 1987, abandoned.

[51] Int. Cl.$^5$ .......................... C08K 3/00; C08F 2/46
[52] U.S. Cl. ....................................... 522/76; 522/77; 522/79; 522/81; 522/83; 522/103
[58] Field of Search ................. 522/76, 77, 79, 81, 522/83, 103

[56] References Cited

U.S. PATENT DOCUMENTS

| | | | |
|---|---|---|---|
| 2,952,595 | 9/1960 | Jordan et al. | 522/77 |
| 3,896,014 | 7/1975 | Rosenberg | 522/30 |
| 4,052,280 | 10/1977 | McGinnis | 522/67 |
| 4,205,018 | 5/1980 | Nagasawa et al. | 522/92 |
| 4,282,269 | 8/1981 | Lucey | 522/96 |
| 4,315,081 | 2/1982 | Kobayashi | 524/141 |
| 4,336,311 | 6/1982 | Lucey | 522/96 |
| 4,349,605 | 9/1982 | Biggs | 522/81 |
| 4,407,984 | 10/1983 | Ratcliffe et al. | 522/83 |
| 4,459,193 | 7/1984 | Ratcliffe et al. | 522/81 |
| 4,510,175 | 4/1985 | Burn | 427/79 |
| 4,514,468 | 4/1985 | Lucey | 428/458 |
| 4,537,940 | 8/1985 | Omura | 522/171 |
| 4,603,158 | 7/1986 | Markham | 524/141 |

Primary Examiner—Marion E. McCamish
Assistant Examiner—Mark A. Chapman
Attorney, Agent, or Firm—Wolf, Greenfield & Sacks

[57] ABSTRACT

Actinic radiation curable composition suitable for use in coating electronic components and as a printing ink comprising as the essential components:

(a) a monomer selected from the group consisting of monofunctional vinyl monomers and multifunctional vinyl monomers; or (b) a prepolymer selected from the group consisting of monofunctional vinyl polymers and multifunctional vinyl polymers;

(c) a photoinitiator;

(d) at least one filler; and (e) at least one surface active agent having a molecular weight greater than or equal to about 227;

wherein one of the surface active agent or the filler has a pH greater than or equal to 7 and the other of the surface active agent or the filler has a pH less than or equal to 7 such that dispersion of the filler in the composition is enhanced and relative high loading of filler in the composition is obtainable;

(f) or at least two surface active agents having a molecular weight greater than or equal to about 227 wherein one of the surface active agents has a pH greater than or equal to 7 and the other surface active agent has a pH less than or equal to 7 wherein the basic surface active agent is used to disperse fillers whose pH is less than or equal to 7 and the acidic surface active agent is used to disperse fillers whose pH is greater than or equal to 7 such that dispersion of the fillers in the composition are enhanced, and relative high loading of fillers in the composition is obtainable.

62 Claims, No Drawings

PHOTOPOLYMERIZABLE COMPOSITIONS USED IN ELECTRONICS

CROSS-REFERENCE TO RELATED APPLICATIONS

This application is a continuation-in-part of application Ser. No. 07/620,378 filed Nov. 29, 1990, now U.S. Pat. No. 5,134,175, which itself is a continuation-in part of application Ser. No. 07/133,497 filed Dec. 16, 1987, now abandoned. The specifications and disclosures of the foregoing applications are incorporated herein by reference.

BACKGROUND OF THE INVENTION

1. Field of the Invention

This invention relates to a UV, or electron beam, or visible light curable coating composition suitable for use in providing a protective barrier coating on electrical and electronic components and as an ink for printing on various substrates.

2. Description of the Prior Art

Electrical and electronic components, e.g., thick and thin film hybrid circuits, tantalum capacitors, axial leaded film-foil capacitors, ceramic disk and tubular capacitors, electrolytic capacitors, radial film foil capacitors, resistors, stacked film capacitors, and related electrical and electronic components must be, in general, provided with a protective coating. Such a coating must provide ease in handling and be capable of imparting to the electrical and electronic component certain desired physical, thermal, electrical insulation and moisture resistance properties. The variety of different shapes of electrical and electronic components that are provided with a protective coating present certain unique problems. The composition used must not only provide the desired properties mentioned as a protective coating, it must also be one that can be applied to the component involved using the most suitable coating procedure. Moreover, as with any coating composition, it is desired that the protective coating be obtained in the mos economical manner without compromise to the various properties desired.

In general, the protective barrier coating on an electrical or electronic component is provided by first coating the electrical and electronic component, or a portion thereof, with a resinous composition, and then heating the coated component at a suitable temperature and for a suitable length of time; whereby the coating composition is cured and adheres to the underlying electrical or electronic component. The post curing step of the coating operation may be shortened in some cases by preheating the component before application of the resinous coating composition. The coating composition used may be, in some cases, either a solid, powdery composition, or, in other cases, one that is liquid, depending somewhat upon the substrate being coated. The use of such a coating composition and procedure is, however, attendant with certain disadvantages. In particular, where the resinous composition is solvent based, this creates environmental considerations. Moreover, such compositions sometimes result in the creation of bubbles and pin-holes in the coating layer created by entrapped air during the curing cycle. Furthermore, conventional thermal curing of resinous coating compositions is not only time consuming but also costly in terms of energy consumption, space, equipment, coating material usage and personnel.

Printing and screening inks are applied to a wide variety of substrates, e.g., metals, metal alloys, paper, thermoplastic and thermosetting resin layers, etc. Nevertheless, particular problems are presented when the substrate is heat sensitive. The ink composition applied must be capable of being cured under conditions not damaging to the substrate.

The ultraviolet curing of coating compositions has been known now for sometime. Exemplary of the prior art are U.S. Pat. Nos. 3,896,014; 4,349,605; and 4,390,401. U.S. Pat. No. 3,896,014 discloses liquid nail lacquer compositions which comprise as the essential components a polyene, a polythiol, a photocuring rate accelerator and, as disclosed by the patentee, a surfactant from a particular class. Among the preferred surfactants are sorbitan sesquioleate, sorbitan dioleate, sorbitan trioleate, pentaerythritol dioleate and pentaerythritol trioleate. Other surfactants found operative in the composition disclosed, but deemed by the patentee to be somewhat less efficient, include alkenyldimethylethyl ammonium bromide; di"coco"dimethyl ammonium chloride quaternary imidazolinium salt (from stearic acid); glyceryl monooleate; glyceryl dioleate; glyceryl trioleate and polyglyceril ester of oleic acid. Nevertheless, a host of other surfactants were discovered to be inoperative in the invention due to the fact that they were either insoluble in the composition, or they did not improve the wettability of the composition as it tended to "bead" when applied to the surface of the nail.

In U.S. Pat. No. 4,349,605, there are disclosed radiation curable polymeric compositions having flame retardant properties which comprise copolymers of ethylene and a comonomer which may be vinyl ester or an acrylate or a methacrylate, a hydrated inorganic filler, an alkoxy silane, and a lubricant comprising lauric acid and ethylene bis-stearamide. The filler can, if desired, be silane treated, rather than adding the filler and silane separately to the composition. Such polymeric compositions are disclosed to be preferably cured by radiation means, although cross-linking of the polymers can also be achieved by chemical crosslinking or thermal crosslinking. According to the patentees, such polymeric compositions will hold very large amounts of filler and still provide high flexibility and a high degree of crosslinking. This is deemed by the patentees to be quite surprising as high flexibility and high crosslinking are generally incompatible, as are high crosslinking and high filler loading (which implies low crosslinkable polymer content). In compositions used for coating, e.g., extruding onto electrical wire and cables, best results, according to the patentees, are obtained when from 44 to 80% by weight of filler in the composition, or 22 to 59% volume of filler, preferably 50 to 57% by weight of filler in the composition, or 26 to 32% volume of filler are employed.

U.S. Pat. No. 4,390,401 discloses ultraviolet curable coating compositions which comprise polyunsaturated polyacrylates or methacrylates and as a wetting agent and adhesive promoter an acrylate or methacrylate of a polyalkylene oxide derivative of a mono hydric alkyl/aryl phenol.

Others, in addition to the patentees in U.S. Pat. No. 4,349,605, have disclosed using a pretreated filler in a polymeric composition. Thus, in U.S. Pat. No. 2,952,595, it has been disclosed that vinyltriethoxysilane treated filler, e.g. hydrated silica, in amounts from about 11 to 34% by weight of the composition or 10 to 30% volume of filler, enhances the beneficial effect that radiation treatment has on the filled polyethylene. Thus, with such treated fillers the impact strength of the compositions has been improved, and the brittle point was lowered, in addition to improved torsional hepteresis.

In Japanese Patent No. 56147846 (Matsushita Electric Works) there is disclosed a photocurable polyester resin composition for the production of thick sheets which comprises unsaturated polyester resin, a photopolymerization initiator, and an inorganic filler, e.g. calcium carbonate, calcium silicate, titanium oxide, aluminum oxide, talc, clay, alumina, calcium hydroxide, and magnesium carbonate, coated with a surfactant. Those surfactants specifically disclosed are stearic acid, lauric acid, rosin, lignin, and cationic surfactant. According to the abstract, the treated filler is used at 16.6 to 80% by weight of the composition. The surface-treated filler is claimed to permit UV to penetrate the composition to deep inside, allowing production of thick sheets. Other patents have cited the use of surfactants in combination with filler or surfactants in combination with polymer. Of interest are U.S. Pat. Nos. 4,510,175; 4,603,158; 4,349,605; 4,537,940; 4,407,984; and 4,459,193.

In U.S. Pat. No. 4,510,175, the patentee discloses preparing a slip composition consisting of ceramic powder, polymer, solvent, and surface active agent. The highest volume % of ceramic powder is 40%. The ceramic slip is prepared by ball milling the polymer, solvent, surfactant and ceramic powder. Slurry is then casted in layered sheets; with each successive sheet being dried before application of the next sheet. The final green ceramic composite is heated to 500 degrees C.; whereby the polymer is decomposed, and the ceramic body densified at 1300-1400 degrees C.

U.S. Pat. No. 4,603,158 describes an optically clear elastomer composition that was formed by molding the elastomer into desired shapes. The constituents of the molded article are an elastomer, fumed silica, coupling agent, antioxidant, thermal curing agents, and a phosphate salt used as an antistatic agent. Fumed silica has been added as a filler. Its volume % is 10-25.

Two patents, U.S. Pat. Nos. 4,349,605 and 4,407,984, use as a specific composition an acrylate, silane treated filler, two or more surfactants, and photoinitiator. The former patent is a solid composition while the latter is a thick paste that requires the addition of solvent to aid in premixing the constituents together. Both patents disclose the use of surface active agents. The surface active agents are acidic and basic. Both acidic and basic agents are added in the composition to disperse identically charged fillers In many examples, more than two dispersants are needed. Of particular importance is the use of a high volume % filler in U.S. Pat. No. 4,407,984. However, the filler is added to the composition with the aid of a solvent, methylene chloride.

Coincidental to the above patent by Ratcliffe is another patent by him, U.S. Pat. No. 4,459,193. In both patents the constituents are the same with one exception. In U.S. Pat. No. 4,459,193, the inventor does not use a surface active agent. The method of addition is the same. Likewise, the solvent, methylene chloride, is used as the medium for incorporating the solid. The solvent eventually evaporates and the composition forms a thick paste, as later disclosed in his patent; utilizing both acidic and basic surface active agents to simultaneously disperse identically charged fillers, i.e., fillers with the same pH.

UV curable phosphate acid ester monomers were described in detail in U.S. Pat. No. 4,537,940. The acid esters were combined with methacrylates, methacrylate powder, silane treated quartz, and a thermal initiator. Formulated systems were used as two part thermal dental adhesives.

None of the prior art of which we are aware provides a composition such as we have invented and disclosed and claim herein.

SUMMARY OF THE INVENTION

This invention, in its basic aspects, is a composition suitable for use in providing a protective coating on a localized area of, or fully encapsulating, an electrical and electronic component and as a printing ink for the imprinting of various substrates. Quite advantageously, when electrical and electronic components are coated with the compositions of the invention, these compositions can be cured with actinic radiation, e.g. ultraviolet or electron beam or visible light radiation, rather than thermally, thereby offering substantial cost savings; yet, obtaining superior performance properties comparable to and in some cases better than, coatings which have been cured only thermally. The cost savings result from increased throughput, lower energy consumption, compact automation, reduced staffing, and less coating material usage.

Most advantageously, the compositions of our invention provide superior physical properties and coatings of consistently high quality, even though such compositions comprise a higher loading of filler than compositions known to be used heretofore for such purposes as disclosed herein. The compositions disclosed herein allow rapid transformation of a completely liquid/solid system, using actinic radiation, into a thermoset polymer thereby eliminating pinholes, peeling, bubbles, while providing a more adequate surface topography, i.e., reducing the amount of material that coats the lead wires.

The novel compositions of the invention can enable the amount of filler loading in the composition to be greater than about 59% by volume of the composition. Examples demonstrating such high loadings are described herein.

These advantages and others are provided by the compositions disclosed herein which, in the more basic aspects, comprise:

(a) a monomer selected from the group consisting of monofunctional vinyl ester monomers selected from the group consisting of acrylate and methacrylate monomers; and/or (b) a prepolymer or oligomer selected from the group consisting of monofunctional vinyl ester resins and multifunctional vinyl ester resins;

(c) a photoinitiator;

(d) a filler; and (e) at least one surface active agent, the agent selected having a molecular weight about or greater than 227 and a pH equal to or less than 7 and the filler having a pH equal to or greater than 7; whereby the filler is dispersed throughout the composition without tending to agglomerate and whereby relatively high loadings can be attained. Conversely, a filler whose pH is less than or equal to 7 may be used in conjunction with a surface active agent whose pH is greater than or equal to 7 and having a molecular weight about or greater than 227. Likewise, at least two surface active agents are needed whose molecular weight is about or greater than 227 and whose pH is greater than or equal to 7 for one surface active agent while the pH is less than or equal to 7 for the other surface active agent, when, respectively, one filler has a pH less than or equal to 7 and the other filler has a pH greater than or equal to 7.

In particular, where a filler is used which has a pH of 7, a surfactant having a pH equal to or greater than 7 is typically necessary in order to obtain the high filler loadings, above about 59% by volume, desired by the preferred invention. Where two fillers are employed, one having a pH equal to 7 and another having a pH greater than 7, then two surfactants, one having a pH equal to or greater than 7 and one having a pH less than 7 is typically required. Where two fillers, one having a pH greater than 7 and one having a pH less than 7 are employed, then two surfactants, one having a pH greater than 7 and another having a pH less than 7, are typically required.

The properties of the compositions disclosed herein and the resulting cured coatings can be altered somewhat by including in the composition various additional materials, according to well known and usual techniques. Thus, for example, the shelf or pot life of a particular composition can be extended by addition of inhibitors or stabilizers. Other additives offer, in some cases, better adhesion to the substrate coated, better fire retardency, improved viscosity, leveling, wetting, flexibility, etc.

Although desirable from the standpoint of cost savings, compositions used for coating axial members and end pour electrical and electronic components, e.g. axial film foil capacitors, axial ceramic capacitors, axial resistors, stacked film foil capacitors, potting compounds for capacitors, hybrid circuit networks, thermistors and transformers need not include a filler. Nevertheless, where pear shaped and radial components are to be coated, a filler is needed for high temperature and high humidity applications.

In addition to the other advantages disclosed above, the compositions of the invention are non polluting, are environmentally safe, and are non toxic.

DETAILED DESCRIPTION OF THE INVENTION AND THE PREFERRED EMBODIMENTS THEREOF

The coating composition of the invention comprises as the essential components a mono- or multifunctional vinyl monomer; and/or a mono- or multifunctional vinyl resin oligomer or prepolymer, a -photoinitiator, a filler, and at least one surface active agent.

The prepolymer can be any mono- or multifunctional resinous material provided it has at least one vinyl group. Illustrative of suitable materials for use as the prepolymer are:
aliphatic urethane acrylate and methacrylate
aromatic urethane acrylate and methacrylate
polyester urethane acrylate and methacrylate
hydrocarbon urethane acrylate and methacrylate
cycloaliphatic epoxy acrylate and methacrylate
aliphatic epoxy acrylate and methacrylate
aromatic epoxy acrylate and methacrylate
amine modified epoxy acrylate and methacrylate
poly(acryloxypropylmethyl)-siloxane
poly(dimethylsiloxane)-(diphenylsiloxane)-(methylvinyl siloxane)
polyvinylmethylsiloxane
tetramethyldisiloxane-ethylene copolymer vinyl terminated polydimethylsiloxane-vinylmethyl copolymers
acrylated and methacrylated epoxy linseed oil
vinyl unsaturated polyesters
polybutadiene acrylate and methacrylate
polystyrene acrylate and methacrylate
polyester acrylate and methacrylate
vinyl caprolactam
caprolactam acrylate and methacrylate
silicone acrylates and methacrylates
melamine acrylate and methacrylate
copolymerized amine acrylate and methacrylate
cellulose acrylate and methacrylate
cellulose ester ether acrylate and methacrylate
hydrocarbon acrylate and methacrylate
polyoxyalkylated bisphenol A acrylate and methacrylate
acrylamidomethyl substituted cellulose ester acrylate and methacrylate
1-norbornene spiroorthocarbonate
2-bismethylene spiroorthocarbonate
diallyl isophthalate
diallyl maleate
diallyl phthalate Of the above prepolymers, aromatic urethane acrylate and methacrylate, hydrocarbon urethane acrylate and methacrylate, aromatic epoxy acrylate and methacrylate, and diallyl isophthalate are preferred; however, any of the above prepolymers can be satisfactorily used. The above prepolymers are not an extensive list of useable prepolymers.

These vinyl unsaturated prepolymers may be added to the composition in amounts of from 0 to 70% by weight of the composition, preferably from 3 to 20% by weight of the composition. Nevertheless, as will be the case with all the components involved, the amount used will be determined somewhat by the properties desired in the cured composition. Which, in turn, will be determined by the particular application involved, i.e., whether the composition is an ink composition or a composition to be used for coating electronic components. If the latter, the particular formulation desired will also be influenced by the particular components to be coated, including the shape thereof, and the manner of coating to be employed, e.g., dip coating, end pour, roll coating, etc.

The monomer used in the compositions of our invention can be a mono- or multifunctional vinyl monomer, the key being that the monomer must have at least one vinyl, or unsaturated, group; whereby it will, on curing as later more specifically disclosed, cross-link and form a thermoset coating or ink. Monomers that will be found suitable in the practice of the invention are:
cyclohexyl acrylate
ethyl acrylate
butyl acrylate
2-ethylhexyl acrylate
2-hydroxyethyl acrylate
hydroxypropyl acrylate
N-vinyl-2-pyrrolidone
2-ethoxy ethoxyethyl acrylate
isobornyl acrylate
methyl acrylate
dimethylaminoethyl acrylate diethylaminoethyl acrylate
tetrahydrofurfuryl acrylate
n-hexyl acrylate
n-lauryl acrylate
2-phenoxyethyl acrylate
furfuryl-2-acrylate
3-dimethylamino neopentyl acrylate
2-cyanoethyl acrylate
benzyl acrylate
2-N-morpholinoethyl acrylate
2-tert-butyl aminoethyl acrylate
N-benzyl methacrylamide
2-(1-aziridinyl)-ethylacrylate
methacrylopyethyl phosphate
bismethacrylopyethylphosphate
N-(iso-butoxymethyl) acrylamide
3-phenoxy-2-hydroxypropyl acrylate
3-methacryloxypropyltris (trimethylsiloxy) silane
3-methacryloxypropylpentamethyldisiloxane
calcium methacrylate
chromium (III) dimethacrylate
sodium methacrylate
magnesium methacrylate
silicone (IV) trimethacrylate
tributyl tin methacrylate
zinc methacrylate
zirconium (IV) dimethacrylate
2-methacryloxyethyl phenylurethane
dicyclopentenyl acrylate
monomethoxy tripropylene lycol monoacrylate
monomethoxy neopentyl glycol ethoxylate monoacrylate
monomethoxy 1, 6 hexanediol monoacrylate
propargyl methacrylate
isocyanotoethyl methacrylate
2-N-morpholinoethyl acrylate
allyl acrylate
styrene
vinyl acetate
N-cyclohexyl methacrylamide
N, N'-isovalerylidene-bis-methacrylamide
3,3,5 trimethylcyclohexyl acrylate
dihydrodicyclopentadienyl acrylate
maleic acid-mono-2-acryloxyethylester
maleic acid-mono-2-methacryloxyethylester
n-octyl acrylate
diallyl fumarate
tripropylene glycol diacrylate
1,6 hexanediol diacrylate
N, N'-methylenebisacrylamide
triethylene glycol diacrylate
ethylene glycol diacrylate
polyethylene glycol diacrylate
1,3 butylene lycol diacrylate
1,4 butanediol diacrylate
diethylene lycol diacrylate
diphenylvinylchlorosilane
1,3 divinyl-1, 3 diphenyl-1, 3 dimethyldisiloxane
1,3-divinyltetramethyldisiloxane
neopentyl glycol diacrylate
ethoxylated bisphenol A diacrylate
caprolactone diacrylate
2-methyl-2-carboxy propanediol diacrylate
thiodiglycol diacrylate
allyl acrylate
dianol diacrylate
3-methylbutene-2-yl-1-acrylate
N,N' hexamethylene-bis-methacrylamide monomethoxy trimethylolpropane diacrylate
monomethoxy pentaerythritol propoxylate triacrylate
monomethoxy lycerol propoxylate diacrylate
trimethylol propane triacrylate
pentaerythritol triacrylate
trimethylolpropane ethoxylate triacrylate
polyether triacrylate
mono-methoxy pentaerythritol propoxylate triacrylate
triallylcyanurate
melamine acrylate
tris (2-hydroxy ethyl) isocyanurate trimethacrylate
1,6 hexanediol diglycidyl ether diacrylate
triallyl trimellitate
pentaerythritol tetraacrylate
dipentaerythritol monohydroxypenta acrylate
dipentaerythritol pentaacrylate
dipentaerythritol hexaacrylate
vinyl tris(isopropenoxy) silane
1,3,5 trivinyl-1,1,3,5, 5-pentamethyltrisiloxane The preferred monomers are alpha, beta unsaturated carboxy compounds. Most preferred monomers are acrylates, and alkacrylates such as isobornyl acrylate, dicyclopentenyl acrylate, 1,6-hexanediol diacrylate, trimethylol propane triacrylate, hydroxypropyl acrylate, pentaerythritol triacrylate, and alkylacrylate relatives of all of the foregoing.

In general, these vinyl unsaturated monomers may be added to the composition in amounts ranging from 1 to 70% by weight of the composition, preferably from about 3 to about 20% by weight of the coating composition used.

Photoinitiators and sensitizers suitable for use in the radiation curable compositions of this invention are any of those commonly used for this purpose. Thus, compositions of this invention can include various known photosynergists, e.g. alkylamines, alkanolamines, and morpholines, or commonly used photoinitiators, e.g. either those involving hydrogen abstraction or intramolecular photocleavage. Examples of suitable photosynergists and sensitizers are:
alkylamines
alkanolamines
morpholines
2-(n-butoxy) ethyl 4-dimethylaminobenzoate
ethyl para dimethyl amino benzoate
2-(dimethylamino) ethyl benzoate
diethanol amine
monoethanol amine
dimethylethanol amine
dimethylaminoethyl acrylate and methacrylate
diethylaminoethyl acrylate and methacrylate
N-methyldiethanolamine
2-ethylhexyl p-(N, N-dimethylamino) benzoate
2,2 dithiobisbenzothiazole
bis-ethylamino benzophenone
Examples of photoinitiators which can be used in the practice of the invention include:
N,N'dimethylaminobenzophenone
d, 1-camphorquinone
2-isopropylthioxanthone
4-isopropylthioxanthone
benzophenone
benzil
2-chlorothioxanthone
2-methylthioxanthone
chlorine functional substituted benzophenone
halogen substituted alkyl-arylketone-4 benzoyl-4-methyl-diphenyl sulphide 2,4,6 trimethylbenzoyldiphenylphosphine oxide
methyl phenylglyoxylate
dibenzosuberone
isobutyl benzoin ether
isopropyl benzoin ether
benzoin ethyl ether
benzoin methyl ether
1-phenyl-1, 2 propane-dione-2-(0-ethoxycarbonyl) oxime
2-2, dimethoxy-2, phenyl-acetophenone
1,hydroxy cyclo hexyl phenyl ketone
2,2 diethoxyacetophenone
2-hydroxy-2 methyl-1 phenyl propan-1-one
2-methyl-1-(4-methylthio) phenyl-2-(4-morpholinyl)-1-propanone
4,4' bis-(dimethylamino) benzophenone
dibenzosuberone
valerophenone
a-tetralone
9-fluorenone
tri-o-tolylphosphine
benz [a] anthracene-7,12-dione
7-H-benz [de] anthracene-7-one
hexanophenone
4,4'dimethoxybenzophenone
4-methoxybenzaldehyde
2,4 dimethylthioxanthone
2,3 butanedione
a, a, a trichloroacetophenone
dimethylsilane-dimethylsiloxane copolymer The preferred photoinitiators for use in the compositions are 2-2 dimethoxy-2, phenyl-acetophenone, 2 hydroxy-2-methyl-1 phenyl propan-1-one, 2-ethylhexyl p-(N, N-dimethylamino) benzoate and 2 isopropylthioxanthone.

In general, the amount of photoinitiator or sensitizer used will depend somewhat upon that particular one chosen, and the formulation of monomers and prepolymers involved. However, as a rule of thumb the photoinitiator used will depend upon the desired depth of cure, reaction kinetics, solubility in the system, shelf life of the composition and wavelength of radiation used. The photoinitiators may be added to the composition in amounts ranging from 1 to 15% by weight of the composition; preferably from about 1 to 6% by weight of the coating composition used.

It will be readily appreciated by those skilled in the art that such initiators and sensitizers as set forth above will not be incorporated in any composition where such is to be cured by electron beam radiation.

Although not a critical feature of the invention, the addition of peroxides or other known accelerators to the compositions disclosed herein will hasten their cure. Thus, in the case where the thickness of the coating layer is to be greater than about 10 mils, it may be desirable to include in the composition such an accelerator. Examples of peroxides that will be found suitable for this purpose, and as an optional component, are:
diacyl peroxide
ketone peroxides
peroxydicarbonates
peroxyesters
dialkyl peroxides
hydroperoxides
sulfonyl peroxides
peroxyketals
symmetric and unsymmetric azonitrile
dialkyl peroxydicarbonate
tetra-alkyl peroxyester
tetra-alkyl hydroperoxide
peroxyacids Of critical significance in the compositions disclosed herein is the incorporation in the composition of at least one surface active agent. Such agents include various of those components that are variously referred to in the art as surfactants, dispersants or dispersing agents, emulsifiers, suspension agents and solubizers. The critical thing in the selection of any particular surface active agent is that such a selection be made in consideration of the filler which is to be used in the composition as the particular surface active agent used will determine the maximum loading of filler in any particular composition. Thus, the surface active agent chosen for use in any particular composition will depend to a great extent upon the pH of the filler to be used, and upon that of any pigment that might also be used in the composition. In general, one must use a surface active agent whose pH is less than or equal to 7 and whose molecular weight is about or greater than 227 in conjunction with a filler whose pH is greater than or equal to 7. Conversely, a surface active agent can be used whose pH is greater than or equal to 7 and whose molecular weight is about or greater than 227 to be used with a filler whose pH is less than or equal to 7. Likewise, the addition of two fillers of acidic and basic character requires two surface active agents of basic and acidic character, respectively. The addition of a filler whose pH is equal to or greater than 7 requires the addition of a surface active agent whose pH is less than or equal to 7. And the addition of a second filler whose pH is equal to or less than 7 requires the addition of a surface active agent whose pH is greater than or equal to 7. Such matching results in the best dispersion of the filler with attendant greater loading.

In some cases, the use of two surface active agents in combination are preferred for best results, especially when the surface active agents are of opposite pH or when one surface active agent has a pH equal to 7. Silane, a neutral surfactant, for example, does not, alone, provide maximum loading of fillers having a negative charge, i.e. a pH greater than 7. Such fillers, e.g. calcium metasilicate (wollastonite having a pH greater than 7), disperse only to a certain loading, e.g. about 72% by weight of the composition, or 49% by volume of filler, and above that loading, the filler tends to agglomerate. Nevertheless, when a different surface active agent or a second surface active agent, e.g., phosphate acid ester (such as GAFAC, RE-610, an acetic surfactant having a pH less than 7), is added to the composition, the filler particles then disperse from one another, with attendant reduction in viscosity.

The surface active agent to be used can, if desired, be used to coat the filler particles prior to their introduction in the composition. Such a pretreatment of fillers is known, and silane treated fillers are available commercially. However, of equal advantage are the low and high molecular weight acidic and basic aromatic, or aliphatic, or ethoxylate, or propoxylate acrylates and methacrylates. The acidic and basic monomer properties disperse and adhere to the filler while the acrylate and methacrylate (vinyl) functions to cross-link the surface treated filler with the polymer network. Use of these monomers as dispersants is advantageous since the silane treated filler can be replaced with these monomers; thereby eliminating the need to pretreat the filler with silane. One of the advantages of treating the filler with silane is to cross-link the silane with the polymer matrix. The same rules apply when adding filler to these monomeric units. The acidic monomers are added to the basic filler and the basic monomers are added to the acidic fillers. Likewise, the use of two different fillers whose surface properties exhibit acidic and basic or neutral character requires the use of two surface active agents of opposite pH or with one of the surface active agents of neutral pH while the other is acidic or basic. Moreover, where two surface active agents are necessary in the composition, to obtain maximum loading and polymer properties, the use of a surface active agent coated filler will be found most advantageous.

Examples of various surface active agents that can be used in the invention to disperse fillers whose pH is greater than or equal to 7 are:
fish oil (one or more of oleic, palmitic and stearic acid)
anionic polyelectrolyte
linoleic acid
oleic acid
palmitic acid
stearic acid
carboxylic acids
oleoyl acids
stearoyl sarcosine
sodium salt of polycarboxylic acids
anionic/nonionic surfactant blends
fatty alcohol ethoxylates
organic phosphate ester acid
methacryloyloxyethane 1,1 diphosphoric acid
vinyl (acrylic or methacrylic) substituted polyaliphatic phosphoric acid
vinyl (acrylic or methacrylic) substituted aromatic phosphoric acid
vinyl (acrylic or methacrylic) substituted bisphenol A phosphoric acid
vinyl (acrylic or methacrylic) substituted polyethoxy phosphoric acid
vinyl (acrylic or methacrylic) substituted polypropoxy phosphoric acid
acid phosphate ester of fatty alcohol alkoxylate
maleic mono acryloyloxyethylester
maleic mono methacryloyloxyethylester
phthalic mono methacryloyloxyethylester
methacrylic acid A most preferred surface active agent is the phosphate acid ester GAFAC, RE-610 to disperse fillers whose pH is greater than or equal to 7. This surface active agent whose pH is less than 7 results in good dispersion of the calcium metasilicate filler whose pH is 9.9 when introduced into the composition. Other phosphate acids esters which are equally useful as dispersants are GAFAC: RS-610, RS-410, RE-410, RM-710, RM 510, RM 410, RS-710, RP 710, PE-510, RD-510, RA-600, Emphos, PS-21A, vinyl (acrylate or methacrylate) substituted aromatic phosphoric acid, vinyl (acrylate or methacrylate) substituted bisphenol A phosphoric acid, vinyl (acrylic or methacrylic) substituted polyaliphatic phosphoric acid, vinyl (acrylic or methacrylic) substituted polyethoxy phosphoric acid, vinyl substituted polypropoxy phosphoric acid, and also non phosphate acid esters such as: fish oil, oleic acid, palmitic acid, stearic acid, maleic mono acryloyloxyethylester, maleic mono methacryloyloxyethylester, phthalic mono methacryloyloxy ethylester, and methacrylic acid. The effect each dispersant has on silane treated calcium metasilicate (400-NYAD) and untreated calcium metasilicate (400-NYAD) are given in Table 1 and Table 2, respectively. Table 1 is a list of dispersants and their effect on the treated filler as illustrated by the high volume % filler. The dispersants used herein give higher volume % filler loadings than the previous mentioned dispersants in U.S. Pat. Nos. 3,896,014; 4,349,605; 4,390,401; 4,510,175; 4,603,158; 4,349,605; 4,537,940; 4,407,984; and 4,459,193. Table 2 is a list of dispersants and their effect on untreated filler. The dispersants used gave a higher % volume filler than previously disclosed in the patents just listed. Examples of surface active agents that can be used in the invention to disperse fillers whose pH is less than or equal to 7 are:
polypropoxyglycol methyl diethyl quaternary ammonium chloride
polypropoxyglycol methyl diethyl quaternary ammonium phosphate
polypropoxyglycol methyl diethyl quaternary ammonium acetate
cationic/nonionic surfactant blends
2-trimethylammonium ethylmethacrylate chloride, or phosphates, or acetates
N-trimethylammonium propylmethacrylamide chloride, or phosphates, or acetates
2-trimethylammoniumethyl acrylate chloride, or phosphate, or acetate The most preferred surface active agent is the quaternary ammonium salt Emco, CC-42. This surface active agent whose pH is neutral or slightly basic gives good dispersion with carbon black (Monarch 1,000) whose pH is 2.5 when introduced into the composition. Also, the quaternary ammonium salt gives good dispersion in systems whose filler is a metal and slightly acidic, i.e., electrolytic copper, and nickel. Equally good results are achieved when the metal or metal oxide is neutral. Neutral metals such as copper, silver, palladium, gold, tungsten, platinum, etc. are dispersed in the quaternary ammonium salt.

Other quaternary ammonium salts which are equally useful as dispersants are Emco: CC-9, CC-55, and the low molecular weight quaternary ammonium salts of methacrylic (acrylic) functionality, such as: BM-604, 2-trimethylammonium ethylmethacrylate chloride, or phosphate, or acetates; BM-613, N-trimethylammonium propylmethacrylamide chloride, or phosphates, or acetates; and BM-607, 2-trimethylammoniumethyl acrylate chloride, or phosphates, or acetates. The effect each dispersant has on carbon black, nickel, and copper are given in Table 3.

When the fillers are of opposite pH values or one filler is either acidic or basic and the other is neutral then one of the surface active agents must have a pH greater than or equal to 7 and the other surface active agent must have a pH less than or equal to 7. Table 4 illustrates the combining of fillers whose pH values are opposite or where one filler, either acidic or basic, is combined with a neutral filler (inorganic).

The monomer, photoinitiator, and surface active agent were mixed at ambient temperature for 15 minutes. Filler was added gradually over 30 minutes; whereby the mixture increased in temperature to 85° due to the high shear generated during mixing. The composition upon mixing remained fluid; whereas, the composition without dispersant was a solid compact cake of high viscosity.

Table 5 is a summary of materials referred to herein by trade or code names listing corresponding chemical names therefor and available sources of supply.

TABLE 1

Effect of Dispersant on Silane Treated Calcium Metasilicate Filler

| Materials | 1 % wt. | 2 % wt. | 3 % wt. | 4 % wt. | 5 % wt. | 6 % wt. | 7 % wt. | 8 % wt. | 9 % wt. | acid value range | average molecular weight |
|---|---|---|---|---|---|---|---|---|---|---|---|
| Monomer HDODA | 12.87 | 12.9 | 14.8 | 16.4 | 12.8 | 12.8 | 12.8 | 12.8 | 12.8 | | |
| Photoinitiator 1173 | 1.6 | 1.6 | 1.6 | 1.6 | 1.6 | 1.6 | 1.6 | 1.6 | 1.6 | | |
| Dispersants | | | | | | | | | | | |
| RE-610 | 1.6 | | | | | | | | | 62–72 | 837 |
| Rs-610 | | 1.6 | | | | | | | | 75–85 | 701 |
| Ps-21A | | | 1.8 | | | | | | | 130 | 431 |
| RS-410 | | | | 3.4 | | | | | | 95–115 | 534 |
| RE-410 | | | | | 3.2 | | | | | 85–100 | 606 |
| RM-710 | | | | | | 1.6 | | | | | 1516 |
| RM-510 | | | | | | | 1.6 | | | 45–55 | 1122 |
| RM-410 | | | | | | | | 5.1 | | 51–64 | 975 |
| BH-650 | | | | | | | | | 19.4 | 370–390 | 147.6 |
| Filler 400-NYAD-10024 | 84.0 | 83.9 | 81.8 | 78.7 | 82.3 | 82.3 | 82.6 | 82.0 | 82.0 | | |
| volume % filler | 65.9 | 65.7 | 62.4 | 63.3 | 65.5 | 65.6 | 60.8 | 47.2 | | | |

| Materials | 10 % wt. | 11 % wt. | 12 % wt. | 13 % wt. | 14 % wt. | 15 % wt. | 16 % wt. | 17 % wt. | 18 % wt. | acid value range | average molecular weight |
|---|---|---|---|---|---|---|---|---|---|---|---|
| Monomer HDODA | 12.8 | 12.8 | 12.8 | 12.8 | 12.8 | 12.8 | 12.8 | 12.8 | 12.8 | | |
| Photoinitiator 1173 | 1.6 | 1.6 | 1.6 | 1.6 | 1.6 | 1.6 | 1.6 | 1.6 | 1.6 | | |
| Dispersants | | | | | | | | | | | |
| RS-710 | 2.5 | | | | | | | | | 58–70 | 876 |
| RP-710 | | 5.0 | | | | | | | | 85–100 | 575 |
| PE-510 | | | 5.5 | | | | | | | 49–59 | 1,039 |
| RD-510 | | | | 4.9 | | | | | | 100–115 | 522 |
| RA-600 | | | | | 7.3 | | | | | 100–115 | 522 |
| RK-500 | | | | | | 11.8 | | | | 132–145 | 405 |
| BI-750 | | | | | | | 15.9 | | | 250–275 | 214 |
| 2-ethyl-hexanoic acid | | | | | | | | 9.7 | | 389 | 144 |
| myristic acid | | | | | | | | | 1.6 | 247 | 227 |
| Filler 400-NYAD 10024 | 82.4 | 82 | 82 | 82 | 82 | 82 | 82 | 81 | 52.7 | | |
| Volume % filler | 64.3 | 60.9 | 60.3 | 61.1 | 58.2 | 53.6 | 50 | 55.3 | 54.8 | | |

| Materials | 19 % wt. | 20 % wt. | 21 % wt. | 22 % wt. | 23 % wt. | 24 % wt. | acid value range | average molecular weight |
|---|---|---|---|---|---|---|---|---|
| Monomer HDODA | 12.8 | 12.8 | 12.8 | 12.8 | 12.8 | 12.8 | | |
| Photoinitiator 1173 | 1.6 | 1.6 | 1.6 | 1.6 | 1.6 | 1.6 | | |
| Dispersants | | | | | | | | |
| palmitic acid | 1.9 | | | | | | 218 | 257 |
| stearic acid | | 1.8 | | | | | 198 | 283 |
| oleic acid | | | 1.6 | | | | 202 | 278 |
| fish oil | | | | 1.6 | | | — | — |
| Z-6030 | | | | | 2.4 | | — | — |
| Filler 400-NYAD-10024 | 77.2 | 78 | 78.6 | 80 | 72.22 | 42.2 | | |
| volume % filler | 63.6 | 63.9 | 64.4 | 64.8 | 49.6 | 51.9 | | |

TABLE 2

Effect of Dispersant on Untreated Calcium Metasilicate Filler

| Materials | 1 % wt. | 2 % wt. | 3 % wt. | 4 % wt. | 5 % wt. | 6 % wt. | 7 % wt. | 8 % wt. | 9 % wt. | 10 % wt. | acid value range | average molecular weight |
|---|---|---|---|---|---|---|---|---|---|---|---|---|
| Monomer | 12.8 | 12.8 | 12.8 | 12.8 | 12.8 | 12.8 | 12.8 | 12.8 | 12.8 | 12.8 | | |

TABLE 2-continued

Effect of Dispersant on Untreated Calcium Metasilicate Filler

| Materials | 1 % wt. | 2 % wt. | 3 % wt. | 4 % wt. | 5 % wt. | 6 % wt. | 7 % wt. | 8 % wt. | 9 % wt. | 10 % wt. | acid value range | average molecular weight |
|---|---|---|---|---|---|---|---|---|---|---|---|---|
| HDODA | | | | | | | | | | | | |
| Photoinitiator 1173 | 1.6 | 1.6 | 1.6 | 1.6 | 1.6 | 1.6 | 1.6 | 1.6 | 1.6 | 1.6 | | |
| Dispersants | | | | | | | | | | | | |
| RE-610 | 1.6 | | | | | | | | | | 62–72 | 837 |
| Rs-610 | | 1.6 | | | | | | | | | 75–85 | 701 |
| Ps-21A | | | 1.6 | | | | | | | | 130 | 431 |
| RE-410 | | | | 3.5 | | | | | | | 85–100 | 606 |
| fish oil | | | | | 1.6 | | | | | | — | — |
| RA-600 | | | | | | 8.5 | | | | | 100–115 | 522 |
| mysteric acid | | | | | | | 1.6 | | | | 247 | 227 |
| oleic acid | | | | | | | | 1.6 | | | 202 | 278 |
| Z-6030 | | | | | | | | | 2.6 | | — | — |
| Filler 400-NYAD | 83.6 | 82.0 | 80.7 | 81.5 | 78.0 | 81.5 | 51.0 | 77.6 | 48.2 | 41.2 | | |
| volume % filler | 65.8 | 65.4 | 65 | 62.7 | 62.3 | 56.8 | 54 | 64.1 | 51.1 | 51.4 | | |

TABLE 3

Effect of Dispersant on Carbon, Copper and Nickel

| Materials | 1 % wt. | 2 % wt. | 3 % wt. | 4 % wt. | 5 % wt. | 6 % wt. | 7 % wt. | 8 % wt. | 9 % wt. | acid value | average molecular weight |
|---|---|---|---|---|---|---|---|---|---|---|---|
| Monomer HPA | 8 | 8 | 8 | 5 | 5 | 5 | 5 | 5 | 5 | | |
| Photoinitiator 1173 | 1.0 | 1.0 | 1.0 | 0.5 | 0.5 | 0.5 | 0.5 | 0.5 | 0.5 | | |
| Dispersants | | | | | | | | | | | |
| CC-42 | 1.6 | | | 0.2 | | | 0.2 | | | NA | 2,500 |
| CC-9 | | 1.6 | | | 0.2 | | | 0.2 | | NA | 2,500 |
| CC-55 | | | 1.7 | | | 0.2 | | | 0.2 | NA | 2,500 |
| Filler | | | | | | | | | | | |
| Carbon Monarch 1000 | 89.4 | 89.4 | 89.3 | | | | | | | | |
| Copper R-290 | | | | 94.3 | 94.3 | 94.3 | | | | | |
| Nickel PN200 | | | | | | | 94.3 | 94.3 | 94.3 | | |
| Volume % Filler | 83.4 | 83.4 | 84.7 | 66.5 | 66.5 | 66.5 | 66.5 | 66.5 | 66.5 | | |

TABLE 4

Effect of Dispersant on Filler Whose pH > 7 and Filler Whose pH ≦ 7

| Materials | 1 % wt. | 2 % wt. |
|---|---|---|
| Monomer HPA | 7.0 | 5.0 |
| Photoinitiator 1173 | 0.5 | 0.5 |
| Dispersant pH < 7 RE-610 | 0.3 | 0.3 |
| Filler pH > 7 400 NYAD | 50.3 | 50.3 |
| Dispersant pH ≧ 7 CC-42 | 0.5 | 0.1 |
| Filler pH ≦ 7 | | |
| Carbon Monarch 1000 (pH < 7) | 41.4 | |
| Nickel PN 200 (pH = 7) | | 43.8 |
| Volume % Filler | 83.8 | 80.2 |

TABLE 5

Materials Used

| Code | Trade Name/Chemical Name | Company |
|---|---|---|

NYCO 400 Wallastonite, calcium metasilicate, NYCO
NYCO 400 Wollastokup 10024, calcium metasilicate, (silane treated filler with Z-6030), NYCO
231-Lupersol, (1,1-di-t-butylperoxy)-3,3,5 trimethylcyclohexane, Pennwalt Corp.
Z-6030, -methacryloxypropyltrimethoxysilane, Dow Corning
Anionic GAFAC ® Surfactant GAF Chemicals
poly(oxy-1,2-ethanediyl), alpha-(dinonylphenyl)-omega-hydroxy, phosphate; or nonyl monoxynol-7-phosphate RM-410
nonyl nonoxynol-10-phosphate RM-510
nonyl nonoxynol-15-phosphate RM-710
poly(oxy-1,2-ethanediyl), alpha-(nonylphenyl)-omega-hydroxy, phosphate
nonoxynol-9-phosphate RE-610
nonoxynol-4-phosphate RE-410
poly(oxy-1,2-ethanediyl), alpha-tridecyl-omega-hydroxy-phosphate
trideceth-6-phosphate RS-610
trideceth-4-phosphate RS-410
trideceth-7-phosphate RS-710
poly(oxy-1,2-ethanediyl), alpha-dodecyl-omega-hydroxy-, phosphate
polyoxyethylene lauryl ether phosphate RD0510
poly(oxy-1,2-ethanediyl), alpha-phenyl-omega-hydroxy-phosphate
polyoxyethylene phenyl ether phosphate RP-710
3,6,9,12-tetraoxahexadecan-1-ol, 15 methyl; dihydrogenphosphate and monohydrogen phosphate

TABLE 5-continued

Materials Used

| Code | Trade Name/Chemical Name | Company |
| --- | --- | --- | isoamyl alcohol, ethoxylated, phosphate-B1750
polyphosphoric acids, 2-Butoxyethyl esters polyoxyethylene butoxyethyl ether phosphate-BH-650
poly(oxy-1,2-ethanediyl), alpha-hexyl-omega-hydroxy-, phosphate; polyoxyethylene hexyl ether phosphate RK-500
Fish oil oleic acid, H.J. Baker & Bro., Inc.
palmitic acid
stearic acid
PS-21A, Emphos, phosphate acid ester, Witco Chemical
1173, Darocur, 2-hydroxy-2-methyl-1-phenyl-propan-1-one, EM Chemicals
1573, Epoxy acrylate Resin, Cargill, Inc.
HDODA, 1,6hexanediol diacrylate, Interez
TMPTA, trimethylolpropane triacrylate, Interez
Fc430, Fluorad, fluorinated hydrocarbon, 3M
Oncor, Thermoguard S, antimony trioxide, M & T Chemicals, Inc.
Air Out, petroleum ether, Furane Products Co.
IR-651, Irgacure, 2,2dimethoxy-2, phenyl-acetophenone, Ciby Geigy
DCPA, dicyclopentenyl acrylate-Alcolac
DBDPO, decabromodiphenyl oxide-Great Lakes
ITX, isopropylthioxanthone, Ward/Blenkinsop
TBP, TRIGONOX C t-butyl peroctoate, Noury Chemical Co.
3600, Celrad-amine modified, diacrylate ester of bisphenol A epoxy resin, Interez
Cab-o-sil, fumed silica, Cabot
EPB, ethyl-para-dimethylaminobenzoate, Ward/Blenkinsnop
325, NYAD, calcium metasilicate, NYCO
325 Wallastokup-10022, NYAD, calcium metasilicate, NYCO
L-722, Silwet, polydimethylsiloxane, Union Carbide
MK, 4,4-Bis(dimethylamino)-benzophenone, Eastman
HPA, Hydroxypropyl acrylate, Rohm Tech
PETA, Pentaerythritol triacrylate, Sartomer
CC-42, Polypropoxyglycol methyl diethyl quaternary ammonium chloride, Witco
CC-55, Polypropoxyglycol methyl diethyl quaternary ammonium acetate, Witco
CC-9, Polypropoxyglycol methyl diethyl quaternary ammonium phosphate, Witco
Monarch 1000, Carbon black, Cabot
R-290, Copper powder, U.S. Bronze
PN200, Nickel powder, Ametek
BM-605, Dimethylaminoethyl acrylate, Rhom Tech Inc.
BM-604, 2-trimethylammonium ethylmethacrylate chloride, Rhom Tech Inc.
BM-613, N-trimethylammonium propylmethacrylamide chloride, Rhom Tech Inc.
BM-607, 2-trimethyammoniumethyl acrylate chloride, Rhom Tech Inc.

The amount of surface active agent used in any particular formulation will depend to some extent on the particular filler used, the process of manufacturing the filler, its surface area, etc., and the amount of filler to be loaded in the composition. The amount filler used, in turn, will depend somewhat upon the particular application for the coating composition. Where a more fluid flowing coating is desired, for example, in potting electrical and electronic components, a lesser amount of filler in general will be used.

Examples of fillers that can be used in the compositions of this invention whose pH are greater than or equal to 7 are:
barium sulfate
talc
sodium carbonate
zinc oxide
silica
silicates
alumina
aluminates
beryllia
metaborates
calcium sulfate
aluminum silicate
phosphates
metasilicates
zirconates
metal oxides
lithium aluminum silicate
wallastonite
titanates Likewise, examples of fillers that can be used in the compositions of this invention whose pH are less than or equal to 7 are:
carbon black
copper
iron oxide
palladium
silver
platinum
glass
nickel
gold
tantalum
tungsten
iron
molybdenum
cadmium
metals
metal oxides
boron
aluminum
titanium
iridium In general, the compositions of this invention will contain a filler from about 2% to about 99% of filler by weight of the composition or 8 to 94% volume of filler, preferably the concentration of filler will be from about 25 to about 94% by weight of the composition or 11 to 85% volume of filler. Where such compositions are used for coating tantalum capacitors, ceramic disc capacitors, radial film foil capacitors, hybrid circuits, etc., less than about 59% by weight of calcium metasilicate filler in the polymeric composition results in polymer degradation with formation of cracks in the coating when such coating is subject to 125° C. for 1,000 hours, a specification which must be met in this application. To some extent the amount of filler in any composition will depend upon the particular application therefor, i.e., what electrical and electronic component is to be coated, and what physical properties are desired in the cured, polymerized, hardened coating. Furthermore, the manner of coating the substrate will also determine to some extent the concentration of filler. In general, for example, where the coating composition is used to end pour an electrical and electronic component less concentration of filler will be desired than in the case of encapsulating a tantalum capacitor.

In addition to the aforesaid essential ingredients, other components such as disclosed hereinafter can be included in the composition, as desired, and so long as they do not interfere with the curing process. Thus, for example, it may be desirable for a particular application, to include in the composition one or more of the following components: a wetting agent, a plasticizer, a leveling agent, a thixotropic agent, a flame retardant, an adhesion promoter, a stabilizer, or an inhibitor, all of which are commonly used in the formulation of coating compositions and inks, to afford certain desired physical properties thereto. To further illustrate the various other additives that may be incorporated in the composition of the invention, the following is given:

Wetting Agents: Examples of various wetting agents that can be used in the invention are: polyethylene glycol fatty esters, nonyl phenol ethylene oxide, fluorinated hydrocarbons, 2,2,3,3 tetrafluoropropylmethacrylate and acrylate, fluorinated alkyl polyoxyethylene ethanol, polypropoxy quaternary ammonium acetate, polymethylsiloxane, and ammonium salt of sulfated nonylphenoxypoly (ethyleneoxy) ethanol. The preferred wetting agents are fluorinated hydrocarbons. Fc-430 is the fluorinated hydrocarbon used herein that is soluble in the composition and, likewise, lowers the composition's surface tension.

Plasticizers: Examples of various plasticizers that can be used in the invention are: adipates, azelates, benzoates, epoxidized linseed oil, hydrocarbons, phosphates, polyesters, phthalates, trimellitates, aliphatic siloxanes, nonionic (polyethylene oxides), anionic (sodium lauryl sulfates), and cationic (cetyl pyridinium chloride). Those skilled in the art of formulating coating compositions will be able to select that particular plasticizer most suitable in any particular application. It will be appreciated, as earlier suggested, that use of such a component in any specific case is entirely optional and will depend upon the desired flexibility in the cured coating. For example, it may be desirable to include a plasticizer in a coating composition containing an epoxy acrylate resin, as such compositions, in general, will be found, on curing, to be relatively rigid.

Leveling Agents: Examples of various leveling agents that can be used in the invention are: sucrose benzoate, copolymer 2-ethylhexyl acrylate and ethyl acrylate, calcium stearate, and nonionic surface active agents.

Thixotropic Agents: Examples of various thixotropic agents that can be used in the invention are: aluminum, calcium and zinc salts of fatty acids such as lauric or stearic a id; fumed silica, hydrated siliceous material, calcium carbonate, magnesium oxide, high molecular weight polyacrylic acids, polymethacrylate, polyacrylates, stearates, polysubstituted sorbitols, bentonite, and chrysotile asbestos. In general, such an additive will be found desirable in compositions used on radial leads, or in applications involving roll coating and dipping. Of the above, fumed silica will be found particularly satisfactory. Also, in addition to the above, it will often be found that any of the fillers above mentioned, will produce the desired thixotropic properties.

Flame Retardants: Examples of various flame retardants that can be used in the invention are: tetrabromo bisphenol A-diacrylate, methyl pentachlorostearate, bis(tribromophenoloxy) ethane, aluminum trihydrate, antimony oxide, chlorinated paraffins, chlorinated cycloaliphatics, aromatic bromine compounds, phosphates, zinc borates, barium metaborates, ammonium fluoroborates, decabromodiphenyl oxide, ammonium bromide, and phosphorium bromide.

Adhesion Promoters: Examples of various adhesion promoters that can be used in the invention are: dimethylaminoethyl acrylate and methacrylate, diethlaminoethyl acrylate and methacrylate, silanes, titanates, allyl ether of cyclic ureido, zircoaluminate, lignocellulosic, and thiodigylcol diacrylates and methacrylates. In some instances, if greater adhesion is required with a particular substrate coated, rather than adding an adhesion promoter, greater adhesion will be obtained by first heating the substrate, and then applying the coating composition.

Stabilizers: Examples of various stabilizers that can be used in the invention are: 2-hydroxy-4-alkoxy benzophenones, 2(2 hydroxy phenyl) benzotriazole, salicylates, resorcinol monobenzoates, aryl or alkyl hydroxy benzoates, substituted oxanilides, substituted formamidine, 2,2 thiobis (4-octylphenolato)-n-butylamine nickel II, nickel salts of thiocarbamate, alkylated phenol phosphonate nickel, and tetramethyl pyperidine. Such compounds will be used as necessary to increase the pot life of the coating or ink composition.

Inhibitors: Examples of various inhibitors that can be used in the invention are: hydroquinone, p-methoxyphenol, alkyl and aryl-substituted hydroquinones and quinones, tert-butyl cathechol, pyrogallol, octadecyl-B-(hydroxy-3,5-di-t-butyl phenyl)-propionate, 2,6-di-tert, butyl-4-methyl phenol, phosphorous acid, beta-napthol, 2,6-di-tert-butyl p-cresol, 2,2-methylenebis(4-ethyl-6-t-butylphenol), p-toluquinone, aryl and alkyl phosphites, and benzotriazoles. Addition of such components to the compositions of this invention will increase the shelf life, as desired.

Those skilled in the art of formulating coating compositions can readily determine the amounts of such optional additives, to be added to any particular composition of our invention, for any particular application and desired property. Such materials are, in general, present in the compositions in very minor concentrations, ranging from less than 5% by weight of the polymer composition, and usually less than 3% by weight of the polymer compositions. In any event, such additives are not included in any significant amount; whereby they will interfere with the cross-linking of the polymeric material, or to lessen the good properties desired and achieved, in the cured coating.

In preparing the coating compositions of this invention, the components are mixed together by conventional procedures used in the production of inks, and coating compositions. These procedures are so well known to those skilled in the art that they do not require further discussion here. However, it should be noted that when the composition is to be UV cured it will be necessary that the photoinitiator be incorporated into the coating composition, and that the curable coating formulation be mixed or blended under "safe light" such as a yellow light source to obviate or minimize photopolymerization.

The components can be mixed together and formulated into the desired composition using any conventional mixing apparatus, e.g. a Banbury or Werner & Pfliderer mixer. The components can be added together in any sequence desired. Nevertheless, it is preferred that the surface active agent be added first to the prepolymer or monomer mixture followed by addition of the filler. Any processing apparatus used should obtain thorough mixing of the essential components such that the surface active agent is intimately and thoroughly dispersed throughout the polymer/monomer mixture.

In the more preferred manner of formulating the compositions of this invention, the filler will be pretreated with a surface active agent. This can be accomplished by using a filler coated in a previous operation, or by adding the surface active agent first to the mixer and next dispersing the filler therein.

The curable coating compositions of this invention can be applied to a suitable surface or substrate, e.g. an electrical and electronic component, by conventional means such as roll or dip coating, end pour, spraying, etc. Curing, or photopolymerization of the coating compositions occurs on exposure of the compositions to any source of radiation emitting actinic radiation at a wavelength within the appropriate ultraviolet or visible spectral regions. Suitable sources of radiation include mercury, xenon, carbon arc and tungsten filament lamps, sunlight, etc. Exposures may be from less than about 4 seconds to 5 minutes or more depending upon the amounts of particular polymerizable materials and photoinitiators being utilized, and depending upon the radiation source and distance from the source, and the thickness of the coating to be cured. The compositions may also be polymerized by exposure to electron beam irradiation without the need of photoinitiator or synergist in the composition. Generally speaking the dosage necessary is from less than 1 megarad to 100 megarad or more.

The following examples, in which all parts are expressed by weight percent of total composition will serve to illustrate the invention more fully.

EXAMPLE 1

UV Curable, Highly Thixothropic, Flame Retardant Conformal Coating for Electrical and Electronic Components This example illustrates the effectiveness of the composition in coating pear-shaped electrical and electronic components such as tantalum capacitors.

The composition is prepared by mixing together the monomer and/or prepolymer, photoinitiators, sensitizers, wetting agent, and dispersant in the weight percentages given below. The mixture is preferably heated to 60° C. whereby any solid photoinitiators are dissolved. When the photoinitiator is completely dissolved, the filler and dispersant are added. Next the flame retardant additives and pigments are added, and mixing continued for 15 minutes while maintaining a temperature within the range of 60°-80° C. The mixture is allowed to cool to ambient conditions before adding the peroxide and bubble breaker. Mixing is resumed at low shear and ambient temperatures until peroxide and bubble breaker are thoroughly mixed.

These compositions are coated onto dry slug tantalum capacitors by dipping the preheated capacitors at 85° C. into the resin composition; and withdrawing the units on chipboards while the units are agitated mechanically. Units are then exposed to actinic radiation within the wavelength region of 185-500 nm for 5 seconds. The same units are subsequently dipped a second time and exposed again to the said radiation for 5 seconds. Coating thicknesses of 250 mils were necessary to ensure complete coverage of the "hockey stick" leads that make up the cathode and anode functions of the capacitor.

As the coating thickness of this electrical and electronic component is 250 mils, the coating is further subjected to a postheat treatment for 15 minutes at 85° C. This thermal treatment hastens the further cross-linking of the polymeric composition. Nevertheless, where the coating thickness is less than about 25 mils, no such thermal treatment is needed, as the crosslinking of the polymeric composition is essentially completed during the UV curing.

The cured coating composition was evaluated according to usual techniques and was found to exhibit low shrinkage, high tensile and compression strength, as well as broad operating temperatures (−65° to 125° C.) over 1000 hours of service life. In addition, the coating is able to withstand high temperature concomitant with high humidity conditions without seriously degrading the electrical behavior of the component. Table 7 illustrates the average electrical properties for twenty units of each of the compositions A-F set forth in Table 6 tested under high temperature (85° C.) concomitant with high humidity (95% RH) conditions for 1,000 hours. In the table, electrical properties are better for the treated filler with dispersant added (composition A) and for the treated filler without dispersant (compositions B and C) than for the untreated filler (composition D). The untreated filler composition showed severe cracking after 500 hours at 125° C. With only the monomer as the polymerizable binder (composition E), electrical properties remain equivalent to a prepolymer system. Addition of a filler, carbon black, with a pH opposite that of calcium metasilicate, required a different surface active agent whose pH is greater than or equal to 7 to disperse the filler (composition F). Electrical properties are equivalent to those using only calcium metasilicate as filler.

As this example shows, the compositions of this invention combine ease in handling with desired physical, thermal, electrical insulation, and moisture resistant properties.

TABLE 6

Dry Slug Tantalum Capacitor Compositions Composition (% wt.)

| Materials | A | B | C | D | E | F |
|---|---|---|---|---|---|---|
| Prepolymer 1573 | 5.5 | 4.0 | 5.0 | 9.0 | | |
| Monomer | | | | | | |
| DCPA | 6.0 | 4.0 | 7.6 | 8.3 | | |
| TMPTA | 6.5 | 12.5 | 10.7 | 8.0 | | |
| HDODA | | | | | | |
| BM-605 | | | | | 1.5 | 1.5 |
| HPA | | | | | 5 | 5 |
| PETA | | | | | 6 | 6 |
| Wetting Agent Fc430 | 0.8 | 1.3 | 1.3 | 0.8 | | |
| Photoinitiator & Sensitizers | | | | | | |
| IR-651 | 2.0 | 2.1 | 2.1 | 2.1 | 1.5 | 1.5 |
| ITX | 1.0 | | | | 0.7 | 0.7 |
| EPB | 1.5 | | | | | |
| Dispersant | | | | | | |
| RE-610 | 1.3 | | | | 1.3 | 1.0 |
| CC-42 | | | | | | 0.3 |
| Flame Retardants | | | | | | |
| Oncor | 2 | 2 | 2 | 2.0 | 1.8 | 1.8 |
| DBDPO | 5.7 | 5.7 | 5.7 | 5.7 | 5.4 | 5.4 |
| Fillers | | | | | | |
| *Nyco 400-10024 (Wallastonite) | 66 | 62.8 | 61.5 | | 75.8 | 65.8 |
| *Nyco 400 (Wallastonite) | | | | 61.5 | | |
| Monarch 1000 | | | | | | 10.0 |
| Pigment Dye | 0.5 | 0.5 | .05 | 0.5 | 0.5 | 0.5 |
| Peroxide | | | | | | |
| TBP | 5.0 | 3.5 | 2.0 | | | |
| L-231 | 1 | | | | 0.5 | 0.5 |
| Bubble Breaker Air Out | 0.1 | 0.1 | 0.1 | 0.1 | | |

*NYCO 400-10024 is calcium metasilicate treated with 1%, Z-6030 silane (Dow Corning) at a 1% by weight silane per calcium metasilicate (Wallastokup)

TABLE 7

Electrical Properties
Humidity at 85° C., 95% RH, for 1,000 hours
Testing done at 0.5 V, 120 Hz

| Compo-sition | Initial Electrical Values | | | Final Electrical Values | | |
|---|---|---|---|---|---|---|
| | CAP (uf) | DF (%) | ESR (ohm) | CAP (uf) | DF (%) | ESR (ohm) |
| A | 48.40 | 3.60 | 0.99 | 49.52 | 3.80 | 1.04 |
| B | 49.11 | 3.72 | 1.01 | 51.00 | 4.29 | 1.12 |
| C | 48.87 | 3.37 | .91 | 50.70 | 3.89 | 1.02 |
| D* | 49.21 | 3.42 | .92 | 51.57 | 6.74 | 1.66 |
| E | 48.6 | 3.61 | .97 | 49.71 | 3.81 | 1.02 |
| F | 49.0 | 3.47 | .93 | 52.0 | 5.63 | 1.46 |

*Test done for only 500 hours. Parts were severely split.
CAP - Capacitance given in microfarads
DF - dissipation factor in percent
ESR - electrical series resistance in ohms

EXAMPLE 2

Low Viscosity, Flame Retardant, UV Curable End Pour System for Smaller Electrical and Electronic Components The composition of this example is particularly suitable as a protective coating for smaller electrical and electronic components such as axial leaded film foil capacitors, hybrid circuits, printed circuit boards, transformers, delay lines, electrolytic capacitors, axial leaded resistors, etc., in which the composition is poured into the end of the tape wrapped unit, preformed casing, metal casing, etc.

The units, end poured in this example, are axial leaded, film foil, cylindrical capacitors whose diameter ranges from 0.0625 to 0.25 inches, and whose length ranges from 0.50 to 1.50 inches.

TABLE 9

Electrical Properties
End Pour, "Mylar" Tape Wrapped Capacitors
Humidity at 75° C., 95% RH, for 100 hours

| Compo-sition | Initial Electrical Values | | | Final Electrical Values | | |
|---|---|---|---|---|---|---|
| | CAP (uf) | DF (%) | ESR (ohm) | CAP (uf) | DF (%) | ESR (ohm) |
| A | 10.41 | .004 | .01 | 10.46 | .004 | .01 |
| B | 10.37 | .004 | .01 | 10.38 | .004 | .01 |
| C | 10.30 | .003 | .01 | 10.28 | .003 | .01 |
| D | 10.39 | .004 | .01 | 10.41 | .004 | .01 |
| E | 10.37 | .004 | .01 | 10.41 | .004 | .01 |
| F | 10.21 | .003 | .01 | 10.28 | .003 | .01 |
| G | 10.38 | .003 | .01 | 10.41 | .003 | .01 |
| H | 10.31 | .003 | .01 | 10.34 | .003 | .01 |

The above compositions (A-H in Table 8 are generally applied by automatic, premeasured, volumetric dispensers. Other methods such as spray and dip application before potting are also possible. Coating thicknesses generally range from 0.010 to 0.500 inches. The coating is subjected to UV curing as before disclosed in Example 1, by exposure for 6 seconds under a medium pressure mercury vapor lamp whose wavelength, for curing, ranges from 185-400 nm. Afterwards, the coating was subjected to a post heat treatment of 85° C. for 15 minutes, to effect complete cure.

Table 9 illustrates the electrical properties taken before and after humidity (95% RH) testing at 75° C. for 100 hours. The data is an average of five axial leaded film foil capacitor values. Compositions A through H gave good electrical values. These compositions are particularly effective in eliminating bubbles and pinholes often created by entrapped air in the end-pour units.

TABLE 8

End Pour Encapsulant Composition (% wt.)

| Materials | A | B | C | D | E | F | G | H |
|---|---|---|---|---|---|---|---|---|
| Prepolymer 1573 | 10 | 9 | 10 | 9 | 10 | 9 | | |
| Monomer | | | | | | | | |
| DCPA | 12 | 20.3 | 13 | 21.2 | 12 | 20.3 | | |
| HDODA | 14 | | 14 | | 14 | | | |
| TMPTA | | 10.5 | | 10.5 | | 10.5 | | |
| HPA | | | | | | | 7 | 7 |
| PETA | | | | | | | 7 | 7 |
| Photoinitiator IR-651 | 2.1 | 2.1 | 2.1 | 2.1 | 2.1 | 2.1 | 1.5 | 1.5 |
| Dispersant | | | | | | | | |
| RE-610 | 1.0 | 0.9 | | | 1.0 | 0.9 | 1.2 | 1.0 |
| CC-44 | | | | | | | | 0.3 |
| Pigment | 1.2 | 1.2 | 1.2 | 1.2 | 1.2 | 1.2 | 0.7 | 0.7 |
| Dye | | | | | | | | |
| Flame Retardant | | | | | | | | |
| Oncor | 2 | 2 | 2 | 2 | 2 | 2 | 1.7 | 1.7 |
| DBDPO | 5.7 | 5.7 | 5.7 | 5.7 | 5.7 | 5.7 | 5.7 | 5.7 |
| Filler | | | | | | | | |
| NYAD-325 | 50 | 46.3 | | | | | | |
| NYAD-325-10022 | | | 50 | 46.3 | 50 | 46.3 | 74.5 | 64.4 |
| Monarch 1000 | | | | | | | | 10.0 |
| Peroxide TBP | 2 | 2 | 2 | 2 | 2 | 2 | 0.7 | 0.7 |
| Viscosity (cps; centipoise) | 550 | 1000 | 750 | 1200 | 400 | 800 | 10,000 | 15,000 |

EXAMPLE 3

Low Viscosity, UV Curable Potting System

The composition in this example (A-H in Table 10) is highly suitable for use in applications involving potting and coating the same electrical components as in Example 2, e.g. radial leaded film foil capacitors, hybrid circuits, printed circuit boards, electrolytic capacitors, transformers, delay lines, resistors, etc. The composition eliminates, or at least lessens the formation of, pinholes and bubbles that often form in potting applications due to outgassing of entrapped air during the potting application. The resin system cures quickly forming an air tight seal, hence, preventing escape of air within the electrical and electronic package. Humidity resistance is a characteristic property for the compositions of this example as well as its adhesion to aluminum, copper, gold, palladium, and silver.

The compositions A-F set forth in Table 10 are applied as in Example 2. Units that are end poured in this Example are axial leaded, film foil, cylindrical capacitors whose diameter ranged from 1.25 to 2.0 inches.

TABLE 10

| Materials | \multicolumn{8}{c}{End Pour Encapsulant Composition (% wt.)} |
|---|---|---|---|---|---|---|---|---|
|  | A | B | C | D | E | F | G | H |
| Prepolymer 1573 | 10 | 9 | 10 | 9 | 10 | 9 |  |  |
| Monomer |  |  |  |  |  |  |  |  |
| DCPA | 12 | 20.3 | 12 | 20.3 | 12 | 20.3 |  |  |
| HDODA | 14 |  | 15 |  | 14 |  |  |  |
| TMPTA |  | 10.5 |  | 11.4 |  | 10.5 |  |  |
| HPA |  |  |  |  |  |  | 5 | 5 |
| PETA |  |  |  |  |  |  | 7 | 7 |
| Photoinitiator IR-651 | 2.1 | 2.1 | 2.1 | 2.1 | 2.1 | 2.1 | 1.5 | 1.5 |
| Dispersant |  |  |  |  |  |  |  |  |
| RE-610 | 1.0 | 0.9 |  |  | 1.0 | 0.9 | 1.3 | 1.2 |
| CC-42 |  |  |  |  |  |  |  | 0.2 |
| Filler |  |  |  |  |  |  |  |  |
| NYAD-325 | 58.9 | 55.2 |  |  |  |  | 84.5 | 74.4 |
| NYAD-325-10022 |  |  | 58.9 | 55.2 | 58.9 | 55.2 |  |  |
| Monarch 1000 |  |  |  |  |  |  |  | 10.0 |
| Peroxide TBP | 2 | 2 | 2 | 2 | 2 | 2 | 0.7 | 0.7 |
| Viscosity (cps) | 1700 | 2000 | 2300 | 2500 | 1500 | 1800 | 9000 | 14,000 |

TABLE 11

Electrical Properties
End Pour, "Mylar" Tape Wrapped Capacitors
Humidity at 75° C., 95% RH. for 100 hours

| Composition | \multicolumn{3}{c}{Initial Electrical Values} | \multicolumn{3}{c}{Final Electrical Values} |
|---|---|---|---|---|---|---|
|  | CAP (uf) | DF (%) | ESR (ohm) | CAP (uf) | DF (%) | ESR (ohm) |
| A | 9.87 | .05 | .01 | 9.94 | .05 | .01 |
| B | 10.21 | .04 | .01 | 10.18 | .04 | .01 |
| C | 9.92 | .03 | .01 | 9.93 | .03 | .01 |
| D | 9.85 | .04 | .01 | 9.97 | .04 | .01 |
| E | 9.92 | .04 | .01 | 9.98 | .04 | .01 |
| F | 9.84 | .03 | .01 | 9.96 | .03 | .01 |
| G | 9.96 | .04 | .01 | 9.99 | .04 | .01 |
| H | 9.89 | .04 | .01 | 9.98 | .04 | .01 |

The resin compositions A-H of this example polymerize to a hard thermoset plastic within 6 seconds of exposure to actinic radiation within the wavelength range of 185-400 nm, from a mercury vapor lamp as earlier disclosed. A postheat treatment for 15 minutes at 85° C. was necessary to effect complete cure.

The coated film foil capacitor was subjected to operating temperatures between −25° to 105° C. for 1000 hours without delamination of the coating from the metallized surface. The filler and pigmentation of the resin composition did not affect the cure properties of the coating, and did not significantly decrease cure speed.

Table 11 illustrates the electrical values for the said capacitor units after humidity (95% RH) testing at 75° C. for 100 hours. Measurements are an average of five film foil capacitor values. Compositions A through H gave good electrical values.

EXAMPLE 4

Low Viscosity, UV Curable Coating System for Electrical and Electronic Components The composition of this example is useful for potting or casting electrical and electronic components and may be used in combination with the composition of Example 3. The rapid cure of the composition in Example 4 allows application of this coating to a substrate that is free of bubbles and pin-holes, often generated during the potting process due to entrapped air within the electrical and electronic components.

The compositions of Example 4 are applied in a manner as described in Example 2. The end pour units of this example are cylindrical, film foil, axial leaded capacitors, with a diameter whose range is from 1.0 to 2.50 inches and a length whose range is from 1.25 to 2.0 inches.

TABLE 12

| Materials | \multicolumn{6}{c}{End Pour Encapsulant Composition (% wt.)} |
|---|---|---|---|---|---|---|
|  | A | B | C | D | E | F |
| Prepolymer |  |  |  |  |  |  |
| 1573 |  | 10 |  | 10 |  | 10 |
| 3600 | 9 |  | 9 |  | 9 |  |
| Monomer |  |  |  |  |  |  |
| DCPA | 10.2 | 4 | 11.2 | 5.0 | 10.2 | 4 |
| TMPTA | 10.5 | 15 | 10.5 | 15 | 10.5 | 15 |
| Photoinitiator IR-651 | 2.1 | 2.1 | 2.1 | 2.1 | 2.1 | 2.1 |
| Dispersant RE-610 | 1.0 |  |  | 1.0 | 1.0 |  |
| Pigment | 1.2 | 1.2 | 1.2 | 1.2 | 1.2 | 1.2 |
| Dye |  |  |  |  |  |  |
| Flame Retardant |  |  |  |  |  |  |

TABLE 12-continued

| | End Pour Encapsulant Composition (% wt.) | | | | | |
|---|---|---|---|---|---|---|
| Materials | A | B | C | D | E | F |
| Oncor | 2 | 2 | 2 | 2 | 2 | 2 |
| DBDPO | 5.7 | 5.7 | 5.7 | 5.7 | 5.7 | 5.7 |
| Filler | | | | | | |
| NYAD-325 | 56.3 | 57 | | | | |
| NYAD-325-10022 | | | 56.3 | 57 | 56.3 | 57 |
| Peroxide | 2 | 2 | 2 | 2 | 2 | 2 |
| TBP | | | | | | |
| Viscosity (cps) | 9100 | 13,200 | 10,000 | 14,100 | 8000 | 11,100 |

TABLE 13

Electrical Properties
End Pour, "Mylar" Tape Wrapped Capacitors
Humidity at 75° C., 95% RH. for 100 hours

| | Initial Electrical Value | | | Final Electrical Value | | |
|---|---|---|---|---|---|---|
| Composition | CAP (uf) | DF (%) | ESR (ohm) | CAP (uf) | DF (%) | ESR (ohm) |
| A | 9.42 | .05 | .01 | 9.63 | .05 | .01 |
| B | 9.32 | .05 | .01 | 9.52 | .05 | .01 |
| C | 8.22 | .04 | .01 | 8.32 | .04 | .01 |
| D | 8.18 | .06 | .01 | 8.26 | .06 | .01 |
| E | 8.20 | .07 | .01 | 8.29 | .07 | .01 |
| F | 9.61 | .05 | .01 | 9.73 | .05 | .01 |

These compositions cure within 6 seconds on exposure to radiation from a mercury vapor lamp as disclosed in Example 1, whose wavelength ranges from 185–400 nm. A postheat treatment for 15 minutes at 85° C. is required to effect complete cure.

The said capacitors of Example 4 are humidity (95% RH) tested at 75° C. for 100 hours. The data illustrated in Table 13, is an average of five film foil capacitor values. Compositions A through F gave good electrical values for coating thicknesses that ranged from 0.010 to 0.090 inches.

The cured coatings exhibit uniform grafting to the polymer coating of Example 3, and good adhesion to metallic substrates.

In many cases, a satisfactory coating may be achieved without pre-coating the electrical and electronic components with the composition of Example 3.

EXAMPLE 5

Flame Retardant, UV Curable Conformal Coating for Hybrid Circuits, Radial Film Foil Capacitors, and Ceramic Capacitors The composition of this example (compositions A–F set forth in Table 14) are useful in coating hybrid circuits, radial film foil capacitors, and ceramic capacitors due to their ability to withstand high humidity environments and temperature extremes from −55° to 125° C.

TABLE 14

| | Hybrid Circuit, Radial Film Foil Capacitor, Ceramic Capacitor Encapsulant Composition (% wt.) | | | | | |
|---|---|---|---|---|---|---|
| Materials | A | B | C | D | E | F |
| Prepolymer 1573 | 8.5 | 6.3 | 7.6 | | | |
| Monomer | | | | | | |
| DCPA | 7.5 | 4.0 | 4.0 | | | |
| TMPTA | 4.3 | 4.7 | 4.7 | | | |
| BM-605 | | | | 2.0 | | |
| HPA | | | | 5.0 | 5.0 | 5.0 |
| PETA | | | | 6.0 | 6.0 | 6.0 |
| Wetting Agent | 2 | 0.8 | 0.8 | | | |

TABLE 14-continued

| | Hybrid Circuit, Radial Film Foil Capacitor, Ceramic Capacitor Encapsulant Composition (% wt.) | | | | | |
|---|---|---|---|---|---|---|
| Materials | A | B | C | D | E | F |
| Fc-430 | | | | | | |
| Plasticizer | 3.6 | 3.0 | 3.0 | | | |
| L-722 | | | | | | |
| Photoinitiator | | | | | | |
| IR-651 | 2.8 | 2.0 | 2.0 | 1.5 | 1.5 | 1.5 |
| ITX | | 2.0 | 2.0 | 1.0 | | |
| MK | | | 0.7 | | | |
| EPB | | 2.0 | | | | |
| Dispersant | | | | | | |
| RE-610 | | 1.6 | 1.6 | 1.4 | 1.3 | 1.4 |
| CC-42 | | | | | 0.2 | |
| Pigment | 0.8 | 0.6 | 0.6 | 0.5 | | 0.5 |
| Dye | | | | | | |
| Flame Retardant | | | | | | |
| Oncor | 2 | 1.9 | 1.9 | 1.8 | 1.8 | |
| DBDPO | 10.5 | 5.7 | 5.7 | 5.7 | 5.7 | |
| Filler | | | | | | |
| *NYCO 400-10024 | 52.6 | 64.3 | 64.3 | 74.3 | 67.8 | 84.9 |
| Monarch 1000 | | | | | 10 | |
| Bubble breaker | | 0.1 | 0.1 | 0.1 | | |
| Air Out | | | | | | |
| Peroxide | | | | | | |
| TBP | 5.5 | | | | | |
| L231 | | 1.0 | 1.0 | 0.7 | 0.7 | 0.7 |

TABLE 15

Electrical Properties
Ceramic Capacitors
Humidity at 85° C., 95% RH, for 1000 hours

| | Initial Electrical Value | | | Final Electrical Value | | |
|---|---|---|---|---|---|---|
| Composition | CAP (uf) | DF (%) | ESR (ohm) | CAP (uf) | DF (%) | ESR (ohm) |
| A | 48.12 | 1.21 | 0.40 | 47.79 | 1.21 | 0.39 |
| B | 48.95 | 1.19 | 0.39 | 49.12 | 1.17 | 0.42 |
| C | 49.14 | 1.29 | 0.42 | 49.46 | 1.32 | 0.44 |
| D | 49.12 | 1.30 | 0.44 | 49.40 | 1.31 | 0.44 |
| E | 48.66 | 1.19 | 0.40 | 49.12 | 1.22 | 0.42 |
| F | 48.67 | 1.21 | 0.41 | 49.23 | 1.26 | 0.44 |

The electrical and electronic components, e.g., hybrid circuits, radial film foil capacitors, and ceramic capacitors, are dip-coated into the resin composition of Example 5, and curing is accomplished by exposing the electrical and electronic units to actinic radiation as described in Example 1, for 6 seconds. A second coating application is necessary to ensure complete electrical and electronic component coverage. After a second coating, the units are exposed to actinic radiation as previously described. The radiation cure is followed by a heat treatment in a convection oven at 85° C. for 15 minutes. The amount of resin used depends upon the configuration and size of the electrical and electronic component. Also, the resin thickness applied in each case depends upon the type of components surface mounted on the hybrid circuit, upon the type of attachment of lead wires on the ceramic capacitor and size of the ceramic capacitor, and upon the size, and shape, and roughness of the radial film foil capacitor. Coating thicknesses vary anywhere from 0.010 to 0.225 inches per dipping application.

Electrical values for disc shaped ceramic capacitors of Example 5 are illustrated in Table 15. These measurements are an average of five ceramic capacitor values. Compositions A through F gave good electrical values after humidity (95% RH) testing at 85° C. for 1000 hours.

EXAMPLE 6

UV Curable Printing Ink for Heat Sensitive Substrate

An ink composition is prepared by combining the following components in the amounts indicated in Table 16.

The viscosity of this composition is determined, in accordance with ASTM D115-82, to be 90,000 to 300,000 cps at 25° C.

The composition is printed onto polypropylene, mylar, and polystyrene (heat sensitive), in accordance with usual techniques, after which it is exposed to actinic radiation as previously described in Example 1, for 2 seconds.

These ink formulations are tested according to Military Standard 883C and all inks pass.

TABLE 16

Ink Formulations for Heat Sensitive Substrates
Compositions (% wt.)

| Material | A | B | C | D | E | F | G | H | I |
|---|---|---|---|---|---|---|---|---|---|
| Prepolymer 1570 | 50 | 50 | 50 | 50 | 50 | 40 | | | |
| Dispersant | | | | | | | | | |
| Re-610 | 0.04 | 0.04 | 0.04 | 0.04 | 0.04 | 0.04 | 1.6 | | 0.5 |
| CC-42 | | | | | | | | 1.4 | 0.8 |
| Monomer | | | | | | | | | |
| TMPTA | 32.96 | 32.96 | 32.06 | 32.96 | 32.96 | 32.6 | | | |
| HPA | | | | | | | 5 | 5 | 5 |
| PETA | | | | | | | 6 | 6 | 6 |
| Photoinitiator | | | | | | | | | |
| IR-651 | | 6 | 6 | 6 | 6 | 6 | | | |
| Lucirin LR8728 | | | | | | | 0.5 | 0.5 | |
| ITX | | 2.5 | 2.5 | 2.5 | 2.5 | 2.5 | | 1.5 | 1.5 |
| BP | | | | | | 1.5 | 1.5 | 1.5 | 1.5 |
| DMAEA | 3.5 | 3.5 | 3.5 | 3.5 | 3.5 | 2.0 | 2.0 | 2.0 | 2.0 |
| Thixotrophic agent Cab-o-sil | 3 | 3 | 3 | 3 | 3 | 3.0 | 1.0 | 1.0 | |
| Pigment | | | | | | | | | |
| Black F2302 | 2 | | | | | | | 81.6 | 52.7 |
| Blue F5203 | | 2 | | | | | | | |
| Green | | | 2 | | | | | | |
| Brown | | | | 2 | | | | | |
| Yellow | | | | | 2 | | | | |
| TiO2 | | | | | | 10 | 30 | | 30 |
| ZnS | | | | | | 10 | 52.4 | | |

| Chemical Names and Availability of Certain Materials Tables 16 and 17 Components | | |
|---|---|---|
| Black-F2302 | Ferro Color Corp. | Composition of CrCuMnMo |
| Blue-F2302 | Ferro Color Corp. | Composition of CoCrAl |
| Green-V7687 | Ferro Color Corp. | Composition of CrCoMgAl |
| Brown-F6114 | Ferro Color Corp. | Composition of CrFeSi |
| Yellow-V9400 | Ferro Color Corp. | Composition of NiSbTi |
| TiO2 | Du Pont | titanium dioxide |
| ZnS | Aceto Chemical | zinc sulfide |
| Lucirin LR8728 | BASF | 2,4,6 trimethyl-benzoyldiphenylphosphine oxide |
| Cab-o-sil | Cabot | fumed silica |
| DMAEA | CPS Chemical CO. | dimethylaminoethyl acrylate |
| ITX | Ward Blinkshop | isopropylthioxanthone |

EXAMPLE 7

UV Curable Composition for Non-Heat Sensitive Substrates

A further ink composition is prepared for non-heat sensitive substrates by mixing together the following components illustrated in Table 17.

TABLE 17

Ink Formulations for Non-Heat Sensitive Substrates
Compositions (% wt.)

| Material | A | B | C | D | E | F | G | H |
|---|---|---|---|---|---|---|---|---|
| Prepolymer 1570 | 45 | 45 | 45 | 45 | 45 | | | |
| Dispersant | | | | | | | | |
| RE-610 | 0.1 | 0.1 | 0.1 | 0.1 | 0.1 | 1.6 | | 0.5 |
| CC-42 | | | | | | | 1.4 | 0.8 |
| Monomer | | | | | | | | |
| TMPTA | 34.9 | 34.9 | 34.9 | 34.9 | 34.9 | | | |
| HPA | | | | | | 4 | 4 | 5 |
| PETA | | | | | | 6 | 5 | 6 |
| Photoinitiator | | | | | | | | |
| IR-651 | 6 | 6 | 6 | 6 | 6 | | | |
| Lucirin LR8728 | | | | | | 0.5 | | |
| ITX | 2.5 | 2.5 | 2.5 | 2.5 | 2.5 | | 1.0 | 1.0 |
| BP | | | | | | 1.0 | 1.0 | 1.0 |
| DMAEA | 3.5 | 3.5 | 3.5 | 3.5 | 3.5 | 2.0 | 2.0 | 2.0 |
| Thixotrophic agent Cab-o-sil | 3 | 3 | 3 | 3 | 3 | 1.0 | 1.0 | |
| Pigment | | | | | | | | |
| Black | 5 | | | | | | 84.6 | 53.7 |
| Blue | | 5 | | | | | | |
| Green | | | 5 | | | | | |
| Brown | | | | 5 | | | | |
| Yellow | | | | | 5 | | | |
| TiO2 | | | | | | 30 | | 30 |
| ZnS | | | | | | 53.9 | | |

These compositions, which had a viscosity of 90,000 to 300,000 cps at 25° C., are printed onto an aluminum can and cured as in the previous example for 8 seconds. The ink compositions exhibit properties comparable to those in the previous example.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. Actinic radiation curable composition suitable for use in coating electronic components and as a printing ink comprising:
   (a) only one of either a monomer selected from the group consisting of monofunctional vinyl monomers and multifunctional vinyl monomers or a prepolymer selected from the group consisting of monofunctional vinyl resins and multifunctional vinyl resins;
   (b) a photoinitiator;
   (c) a filler; and
   (d) at least one surface active agent having a molecular weight greater than or equal to about 227;
wherein one of the surface active agent or the filler has a pH greater than or equal to 7 and the other of the surface active agent or the filler has a pH less than or equal to 7 such that dispersion of the filler in the composition is enhanced and relative high loading of filler in the composition is obtainable.

2. Actinic radiation curable composition according to claim 1 wherein the prepolymer is an aromatic epoxy acrylate.

3. Actinic radiation curable composition according to claim 2 wherein the aromatic epoxy acrylate is a diacrylate ester of bisphenol A epoxy.

4. Actinic radiation curable composition according to claim 1 wherein the monomer is trimethylol propane triacrylate and/or 1,6 hexanediol diacrylate.

5. Actinic radiation curable composition according to claim 1 wherein the monomer is dicyclopentenyl acrylate.

6. Actinic radiation curable composition according to claim 1 wherein the monomer is pentaerythritol triacrylate.

7. Actinic radiation curable composition according to claim 1 wherein the monomer is hydroxypropyl acrylate.

8. Actinic radiation curable composition according to claim 1 wherein the monomer is dimethylaminoethyl acrylate.

9. Actinic radiation curable composition according to claim 1 wherein the photoaccelerator is selected from the group of 2-isopropyl-thioxanthone, 2-2 dimethoxy-2, phenyl-acetophenone, 2 hydroxy-2 methyl-1 phenyl propan-1-one, ethyl p-(N,N-dimethylamino) benzoate, and 2-(dimethylamino) ethyl benzoate.

10. Actinic radiation curable composition according to claim 1 wherein the filler is calcium metasilicate, or titanium dioxide, or zinc sulfide.

11. Actinic radiation curable composition according to claim 1 wherein the filler is carbon black.

12. Actinic radiation curable composition according to claim 1 wherein the filler is an alloy of chromium/copper/manganese/molybdenum, or cobalt/chromium/aluminum, or chromium/cobalt/magnesium/aluminum, or chromium/iron/silicon, or nickel/tin/titanium.

13. Actinic radiation curable composition according to claim 1 wherein the filler is copper, or aluminum, or iron oxide, or silver, or gold, or palladium, or platinum, or iridium, or tin, or lead, or cobalt, or iron, or magnesium, or silicon, or nickel, or manganese, or chromium, or tungsten, or titanium.

14. Actinic radiation curable composition according to claim 1 wherein the composition contains at least one surface active agent.

15. Actinic radiation curable composition according to claim 14 wherein one surface active agent is an organic phosphate ester.

16. Actinic radiation curable composition according to claim 15 wherein the organic phosphate acid ester is selected from the group of nonyl nonoxynol-7-phosphate, nonyl nonoxynol-10-phosphate, nonyl nonoxynol-15-phosphate, nonoxynol-9-phosphate, nonoxynol-4-phosphate, trideceth-6-phosphate, trideceth-4-phosphate, trideceth-7-phosphate, polyoxyethylene lauryl ether phosphate, polyoxyethylene phenyl ether phosphate, isoamyl alcohol ethoxylated phosphate, polyoxyethylene butoxyethyl ether phosphate, and polyoxyethylene hexyl ether phosphate.

17. Actinic radiation curable composition according to claim 14 wherein one surface active agent is a quaternary ammonium salt.

18. Actinic radiation curable composition according to claim 17 wherein the quaternary ammonium salt is selected from the group of polypropoxyglycol methyl diethyl quaternary ammonium acetate, polypropoxyglycol methyl diethyl quaternary ammonium phosphate, and polypropoxyglycol methyl diethyl quaternary ammonium chloride.

19. Actinic radiation curable composition according to claim 14 wherein one surface active agent is an acrylic or methacrylic organic phosphate acid ester.

20. Actinic radiation curable composition according to claim 19 wherein the acrylic or methacrylic organic phosphate acid ester is selected from the group of vinyl (acrylic or methacrylic) polyaliphatic phosphoric acid, vinyl (acrylic or methacrylic) aromatic phosphoric acid, vinyl (acrylic or methacrylic) bisphenol A phosphoric acid, vinyl (acrylic or methacrylic) polyethoxy phosphoric acid, and vinyl (acrylic methacrylic) polypropoxy phosphoric acid.

21. Actinic radiation curable composition according to claim 14 wherein one surface active agent is an organic acid and/or alcohol.

22. Actinic radiation curable composition according to claim 20 wherein the organic acid is selected from the group of oleic acid, palmitic acid, stearic acid, fish oil, linoleic acid, carboxylic acids, oleoyl acids, and titanates.

23. Actinic radiation curable composition according to claim 14 wherein one surface active agent is an acrylic or methacrylic quaternary ammonium salt.

24. Actinic radiation curable composition according to claim 23 wherein the acrylic or methacrylic quaternary ammonium salt is selected from the group of 2-trimethyl ammonium ethylmethacrylate chloride, N-trimethylammonium propylmethacrylamide chloride, and 2-trimethylammoniumethyl acrylate chloride.

25. Actinic radiation curable composition according to claim 14 wherein one surface active agent is an acrylic or methacrylic organic acid.

26. Actinic radiation curable composition according to claim 25 wherein the acrylic or methacrylic organic acid is selected from the group of maleic mono acryloyloxyethylester, maleic mono methacryloyloxyethylester, phthalic mono methacryloyloxylester, methacrylic acid, and acrylic acid.

27. Actinic radiation curable composition according to claim 1 wherein the filler used has been precoated with a surface active agent.

28. Actinic radiation curable composition according to claim 1 wherein the filler used has not been precoated with a surface active agent.

29. Actinic radiation curable composition according to claim 1 wherein the precoated filler is calcium metasilicate and the surface active agent is a silane.

30. Actinic radiation curable composition according to claim 29 wherein the silane is methacryloxypropyltrimethoxysilane.

31. Actinic radiation curable composition according to claim 1 wherein the precoated filler is calcium metasilicate and the surface active agent is an organic phosphate ester.

32. Actinic radiation curable composition according to claim 1 wherein the precoated filler is calcium metasilicate and the surface active agent is an acrylic or methacrylic organic phosphate acid ester.

33. Actinic radiation curable composition according to claim 1 wherein the filler is calcium metasilicate and the surface active agent is an organic acid and/or alcohol.

34. Actinic radiation curable composition according to claim 1 wherein the filler is calcium metasilicate and the surface active agent is an acrylic or methacrylic organic acid and/or alcohol.

35. Actinic radiation curable composition according to claim 1 wherein the filler is carbon black and the surface active agent is an acrylic or methacrylic quaternary ammonium salt and/or alcohol.

36. Actinic radiation curable composition according to claim 1 wherein the filler is carbon black and the surface active agent is a quaternary ammonium salt and/or alcohol.

37. Actinic radiation curable composition according to claim 1 wherein the filler is a metal alloy of cobalt/chromium/aluminum, or chromium/cobalt/magnesium/aluminum, or chromium/iron/silicon, or nickel/tin/titanium, and the surface active agent is a quaternary ammonium salt and/or alcohol.

38. Actinic radiation curable composition according to claim 1 wherein the filler is a metal alloy of cobalt/chromium/aluminum, of chromium/cobalt/magnesium/aluminum, or chromium/iron/silicon, or nickel/tin/titanium, and the surface active agent is an acrylic or methacrylic quaternary ammonium salt and/or alcohol.

39. Actinic radiation curable composition according to claim 1 wherein the filler is a metal of copper, or palladium, or platinum, or nickel, or tantalum, or molybdenum, or iron, or silver, or gold, or tungsten, or boron, or iridium, or aluminum, or titanium and the surface active agent is a quaternary ammonium salt and/or alcohol.

40. Actinic radiation curable composition according to claim 1 wherein the filler is a metal of copper, or pallatium, or platinum, or nickel, or tantalum, or molybdenum, or iron, or silver, or gold, or tungsten, or boron, or iridium, or aluminum, and the surface active agent is an acrylic or methacrylic quaternary ammonium salt and/or alcohol.

41. Actinic radiation curable composition according to claim 1 wherein the composition further comprises a flame retardant component.

42. Actinic radiation curable composition according to claim 1 wherein the composition further comprises an inhibitor component.

43. Actinic radiation curable composition according to claim 1 wherein the composition further includes a thixotropic agent.

44. Actinic radiation curable composition according to claim 43 wherein the thixotropic agent is fumed silica.

45. An electrical or electronic component coated with a composition according to the composition of claim 1.

46. Actinic radiation curable composition according to claim 1 wherein monofunctional vinyl monomers are selected from the group of monofunctional alpha, beta unsaturated carboxy monomers and wherein the multifunctional vinyl monomers are selected from the group of multifunctional alpha, beta unsaturated carboxy monomers.

47. Actinic radiation curable composition according to claim 1 wherein the prepolymer is between about 0 and about 70% by weight, the monomer is between about 1 and about 70% by weight, the photoinitiator is between about 1 and about 70% by weight, the filler is between about 25 and about 90% by weight and the surface active agent(s) is between about 0.5 and about 4% by weight of the composition.

48. Actinic radiation curable composition according to claim 1 wherein the prepolymer is between about 3 and about 20% by weight, the monomer is between about 3 and about 20% by weight, the photoinitiator is between about 2 and about 6% by weight, the filler is at least about 45% by weight, and the surface active agent(s) is between about 0.5 and about 4% by weight of the composition.

49. Actinic radiation curable composition according to claim 1 wherein the composition includes a first filler having a pH greater than 7, a second filler having a pH less than 7, a first surface active agent having a pH greater than 7 and a second surface active agent having a pH less than 7, the surface active agents having a molecular weight greater than or equal to about 227.

50. Actinic radiation curable composition according to claim 1 wherein the composition includes a first surface active agent having a pH greater than 7 and a second surface active agent having a pH less than 7, the surface active agents having a molecular weight greater than or equal to about 227.

51. Method of preparing an UV curable coating composition useful for coating electronic components comprising the following steps:
  (a) selecting one of either a monomer selected from the group consisting of monofunctional vinyl ester monomers or a prepolymer selected from the group consisting of monofunctional vinyl ester resins and multifunctional vinyl ester resins;
  (b) admixing with the monomer or prepolymer a filler;
  (c) admixing with the mixture at least two surface active agents having a molecular weight greater than or equal to about 227 wherein one of the surface active agents has a pH greater than or equal to 7 and the other surface active agent has a pH less than or equal to 7 where the basic surface active agent disperses filler having a pH less than or equal to 7 and the acidic surface active agent disperses filler having a pH greater than or equal to 7; and
  (d) admixing with the mixture a photoinitiator for polymerizing the monomer or prepolymer.

52. Method according to claim 51 wherein the filler has been pretreated with a surface active agent.

53. Method according to claim 51 wherein the filler has not been pretreated with a surface active agent.

54. Improved composition capable of being UV cured and suitable for use as a printing ink comprising:
(a) only one of either a monomer selected from the group consisting of monofunctional vinyl ester monomers selected from the group consisting of acrylate and methacrylate monomers, and multifunctional vinyl ester monomers selected from the group consisting of acrylate and methacrylate monomers or a prepolymer selected from the group consisting of monofunctional vinyl ester resins and multifunctional ester resins;
(b) a photoinitiator;
(c) a pigment; and
(d) at least one surface active agent having a molecular weight greater than or equal to about 227;
wherein one of the surface active agent or the pigment has a pH greater than or equal to 7 and the other of the surface active agent or pigment has a pH less than or equal to 7.

55. A process for preparing a cured coating layer on an electrical component comprising the steps of:,
(a) preparing a coating composition comprising:
(1) only one of a monomer selected from the group consisting of monofunctional vinyl ester monomers selected from the group consisting of acrylate and methacrylate monomers, and multifunctional vinyl ester monomers selected from the group consisting of acrylate and methacrylate monomers; or a prepolymer selected from the group consisting of monofunctional ester resins and multifunctional ester resins;
(2) a photoinitiator;
(3) a filler; and
(4) at least one surface active agent having a molecular weight greater than or equal to about 227;
wherein one of the surface active agent or the filler has a pH greater than or equal to 7 and the other of the surface active agent or the filler has a pH less than or equal to 7 such that the dispersion of the filler in the composition is enhanced and relative high loading of filler in the composition is obtainable;
(b) coating a desired electrical component with the said composition; and
(c) exposing the coating to actinic radiation at a wavelength within the ultraviolet and visible spectral regions or electron beam irradiation and for a period of time sufficient to cure the coating.

56. Process according to claim 55 wherein the cured coating is subjected to a post heat treatment at a suitable temperature and for a suitable period of time to complete the cure of the polymeric coating.

57. Actinic radiation curable composition suitable for use in coating electronic components and as a printing ink comprising:
(a) only one of either a monomer selected from the group consisting of monofunctional vinyl monomers and multifunctional vinyl monomers or a prepolymer selected from the group consisting of monofunctional vinyl resins and multifunctional vinyl resins;
(b) a photoinitiator;
(c) a first filler having a pH of 7 and a second filler having a pH greater than 7; and
(d) a first surface active agent having a pH greater than or equal to 7 and a second surface active agent having a pH less than 7 such that dispersion of the filler in the composition is enhanced and relative high loading of filler in the composition is obtainable, the surface active agents having a molecular weight greater than or equal to about 227.

58. Actinic radiation curable composition suitable for use in coating electronic components and as a printing ink comprising:
(a) a monomer selected from the group consisting of monofunctional vinyl monomers and multifunctional vinyl monomers:
(b) a prepolymer selected from the group consisting of monofunctional vinyl resins and multifunctional vinyl resins;
(c) a photoinitiator;
(d) a filler; and
(e) a first surface active agent having a pH greater than 7 and a second surface active agent having a pH less than 7 such that dispersion of the filler in the composition is enhanced and relative high loading of filler in the composition is obtainable, the surface active agents having a molecular weight greater than or equal to about 227.

59. Actinic radiation curable composition according to claim 58 wherein the composition includes a first filler having a pH greater than 7 and a second filler having a pH less than 7.

60. Actinic radiation curable composition suitable for use in coating electronic components and as a printing ink comprising:
(a) a monomer selected from the group consisting of monofunctional vinyl monomers and multifunctional vinyl monomers;
(b) a prepolymer selected from the group consisting of monofunctional vinyl resins and multifunctional vinyl resins;
(c) a photoinitiator;
(d) a first filler having a pH of 7 and a second filler having a pH greater than 7; and
(e) a first surface active agent having a pH greater than or equal to 7 and a second surface active agent having a pH less than 7 such that dispersion of the filler in the composition is enhanced and relative high loading of filler in the composition is obtainable, the surface active agents having a molecular weight greater than or equal to about 227.

61. Actinic radiation curable composition suitable for use in coating electronic components and as a printing ink comprising:
(a) only one of either a monomer selected from the group consisting of monofunctional vinyl monomers and multifunctional vinyl monomers or a prepolymer selected from the group consisting of monofunctional vinyl resins and multifunctional vinyl resins;
(b) a photoinitiator;
(c) a filler; and
(d) one surface active agent having a molecular weight greater than or equal to about 227;
wherein one of the surface active agent or the filler has a pH greater than or equal to 7 and the other of the surface active agent or the filler has a pH less than or equal to 7 such that dispersion of the filler in the composition is enhanced and relative high loading of filler in the composition is obtainable.

62. Actinic radiation curable composition suitable for use in coating electronic components and as a printing ink comprising:

(a) a monomer selected from the group consisting of monofunctional vinyl monomers and multifunctional vinyl monomers;
(b) a prepolymer selected from the group consisting of monofunctional vinyl resins and multifunctional vinyl resins;
(c) a photoinitiator;
(d) a filler; and
(e) one surface active agent having a molecular weight greater than or equal to about 227;

wherein one of the surface active agent or the filler has a pH greater than or equal to 7 and the other of the surface active agent or the filler has a pH less than or equal to 7 such that dispersion of the filler in the composition is enhanced and relative high loading of filler in the composition is obtainable.

* * * * *